(12) United States Patent
Kullin

(10) Patent No.: US 9,127,752 B2
(45) Date of Patent: Sep. 8, 2015

(54) METHOD OF REDUCING A ROTATIONAL OUTPUT RATE FROM A COAXIALLY ARRANGED ROTATING INPUT

(71) Applicant: Arne Lars Jonas Kullin, Ann Arbor, MI (US)

(72) Inventor: Arne Lars Jonas Kullin, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 188 days.

(21) Appl. No.: 13/717,949

(22) Filed: Dec. 18, 2012

(65) Prior Publication Data

US 2014/0171249 A1     Jun. 19, 2014

(51) Int. Cl.
    *F16H 1/32*     (2006.01)
(52) U.S. Cl.
    CPC ............ *F16H 1/32* (2013.01); *F16H 2001/324* (2013.01)
(58) Field of Classification Search
    USPC .................................................. 475/176, 180
    See application file for complete search history.

(56) References Cited

U.S. PATENT DOCUMENTS

| 6,743,137 B2 * | 6/2004 | Rilbe ............................. 475/163 |
| 2002/0025875 A1 * | 2/2002 | Tsujioka ....................... 475/162 |

\* cited by examiner

*Primary Examiner* — Edwin A Young
*Assistant Examiner* — Timothy M Hannon
(74) *Attorney, Agent, or Firm* — Mark Ussai; SKF USA Inc. Patent Dept.

(57) ABSTRACT

A method of rotating an output gear at a rotational rate that is slower than an input rotational rate. The input rotation moves a planetary gear in a circular motion about a central axis. A first stage external gear configuration of the planetary gear engages with an internal gear configuration of a stationary gear. The engagement rotates the planetary gear about a concentrically located planetary gear rotational axis. A second stage external gear configuration is rotated by and at a same rate the first stage external gear configuration. The first stage diameter and/or number of teeth differs from the second stage diameter and/or number of teeth. The planetary gear rotation in conjunction with the difference between the first and second stages causes the output gear to rotate respective to the stationary gear. Rotational positioning of the output gear can be monitoring and adjusted by controlling the input rotational rate.

20 Claims, 22 Drawing Sheets

METHOD OF REDUCING A ROTATIONAL OUTPUT RATE FROM A COAXIALLY ARRANGED ROTATING INPUT

FIELD OF THE INVENTION

The present invention relates to a method of providing an output rotational rate that is lower than an input rotational rate to provide a precise rotational motion of an object. More specifically, the method utilizes a planetary gear arrangement in conjunction with an offset gear configuration resulting in a high torque, highly accurate rotational motion.

BACKGROUND OF THE INVENTION

Discussion of the Related Art

Many devices require precision rotational positioning. The current solutions commonly incorporate stepper motors, which are expensive and are subjected to required maintenance. Stepper motors are selected by the rotational accuracy and generated torsional force. The stepper motor design dictates the installation location. Inclusion of an intermediary component, such as a belt or transmission, would reduce the rotational accuracy of the system. Stepper motors, by the nature of their design, rotate in accordance with a pulsing pattern. Stepper motors require calibration and homing. Should the stepper motor fail, the entire stepper motor is commonly replaced.

The use of worm gears introduces axial sliding. Worm gears require maintenance, such as lubrication, and the like. Worm gears have limited efficiency by design.

Gears are known to introduce tolerances. The tolerances reduce the positional accuracy of the system.

Thus, what is desired is a low cost rotational control device capable of rotating objects at precise angular increments. The rotational control device would have additional advantages if the device were adaptable for a variety of installation configurations.

SUMMARY OF THE INVENTION

The present invention is directed to a device that converts a low torque, high rotational speed input into a high torque low rotational speed output.

In a first aspect of the present invention, a coaxially arranged reduction gear assembly comprising:

a stationary gear section having a quantity of stationary gear teeth disposed in a spatial arrangement about an interior circumferential surface forming a stationary gear having an internal gear configuration;

a input shaft and planetary carrier combination comprising an input shaft having a central shaft rotational axis and a planetary gear cam having a planetary gear rotational axis, wherein the planetary gear rotational axis and central shaft rotational axis offset from one another by a planetary gear rotational offset;

a planetary gear comprising a planet wheel gear first stage having a quantity of planet wheel gear first stage teeth disposed in a spatial arrangement about a peripheral surface forming a first stage gear having an external gear configuration and a planet wheel gear second stage having a quantity of planet wheel gear second stage teeth disposed in a spatial arrangement about a peripheral surface forming a second stage gear having an external gear configuration, wherein the planet wheel gear first stage and the planet wheel gear second stage are concentric with one another and the first stage quantity of teeth differs from the second stage quantity of teeth; and an output rotational gear section having a quantity of output rotational gear teeth disposed in a spatial arrangement about an interior circumferential surface forming an output rotational gear having an internal gear configuration;

wherein the planetary gear is rotationally assembled to the planetary gear cam;

the first stage external gear is positioned in engagement with the internal stationary gear and the second stage external gear is positioned in engagement with the output rotational gear.

In a second aspect of the present invention, the stationary gear section and output gear section form an enclosure.

In another aspect, the stationary gear section further comprises a concentrically located input shaft aperture and the output rotational gear section comprises a concentrically located distal shaft support aperture.

In yet another aspect, the coaxially arranged reduction gear assembly further comprises a rotational bearing integrated between the planetary gear and the planetary gear cam.

In yet another aspect, the coaxially arranged reduction gear assembly further comprises an input gear support bearing integrated between an input section of the input shaft and planetary carrier combination and the input shaft aperture and an input gear distal support bearing integrated between a distal support section of the input shaft and planetary carrier combination and the distal shaft support aperture.

In yet another aspect, an enclosure bearing is integrated between the stationary gear section and output gear section providing rotational support therebetween.

In yet another aspect, the input shaft further has a non-circular cross sectional shape.

In yet another aspect, the input shaft further comprises a series of spatially arranged input gear teeth.

In yet another aspect, the input shaft further comprises a series of spatially arranged input gear teeth forming an external gear.

In yet another aspect, the planet wheel gear first stage and the planet wheel gear second stage are fabricated as a unitary component.

In yet another aspect, a diameter of the planet wheel gear first stage differs from a diameter of the planet wheel gear second stage.

In yet another aspect, a diameter of the planet wheel gear first stage differs from a diameter of the planet wheel gear second stage.

In yet another aspect, the diameter of the planet wheel gear first stage is greater than the diameter of the planet wheel gear second stage.

In yet another aspect, the diameter of the planet wheel gear first stage is smaller than the diameter of the planet wheel gear second stage. It is noted that in this configuration the output gear would rotate in an opposite direction.

In yet another aspect, the planetary gear further comprises a planetary gear gap provided between the planet wheel gear first stage and the planet wheel gear second stage.

In yet another aspect, the coaxially arranged reduction gear assembly is integrated into a system further comprising a direct drive rotational drive mechanism.

In yet another aspect, the coaxially arranged reduction gear assembly is integrated into a system further comprising an offset drive rotational drive mechanism.

In yet another aspect, the offset drive rotational drive mechanism is in operational communication with the input shaft by at least one of a belt, a series of gears, a transmission, a clutch, and the like.

In yet another aspect, the reduction gear can include a self-lock feature. The self-lock feature is determined by the gear ration and coefficient of friction. A high friction and high gear configuration would generate a self locking configuration.

In yet another aspect, the offset drive rotational drive mechanism is in operational communication with a controller.

In yet another aspect, the controller is in signal communication with at least one rotational position-identifying sensor.

The coaxial reduction gear assembly provides several advantages over the currently known art. The coaxial reduction gear assembly provides a reduction gear that enables precision rotational control as a result of significant gearing ratios. The ratio can be designed to range from as low as 40 to 1 to a significantly high ratio of 250,000 to 1, understanding these are exemplary and not limiting. The ratio can be modified by changing the number of teeth of both the ring gears and the planetary gears, or simply by replacing the planetary gears with a set of planetary gears having a different number of teeth. The higher the ratio, the greater the accuracy of rotation. The higher ratios compensate for tolerances in the gearing. The higher the ratio, the greater the torque conversion, thus lowering the power requirements for rotating the attached object. The reduced power input requirement can reduce the costs of the rotational drive mechanism. The motor is subjected to a reduced load as a result of the reduced torsional requirements, thus increasing the longevity of the motor.

The coaxial reduction gear assembly can be operated by an intelligent controller, wherein the controller, as a system, includes sensors to identify the rotational position of the output rotational gear section. This configuration provides the control and benefits of a stepper motor at a lower cost. The coaxial reduction gear assembly provides a rotational control solution that has a longer life, less maintenance, and is more efficient than a worm gear.

The coaxial reduction gear assembly can include a feature to self-lock the rotation, thus providing a unidirectional solution.

The coaxial reduction gear assembly would be adaptable to suit a variety of motor placements, including a linear drive configuration and/or an offset drive configuration.

The coaxial reduction gear assembly provides a continuous drive solution, compared to a stepper motor, which provides a pulsed motion.

The ratio of the coaxial reduction gear assembly can be changed by replacing the planetary gear configuration, the input shaft and planetary carrier combination with one having a different planetary gear rotational offset, and the like, or any combination thereof.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
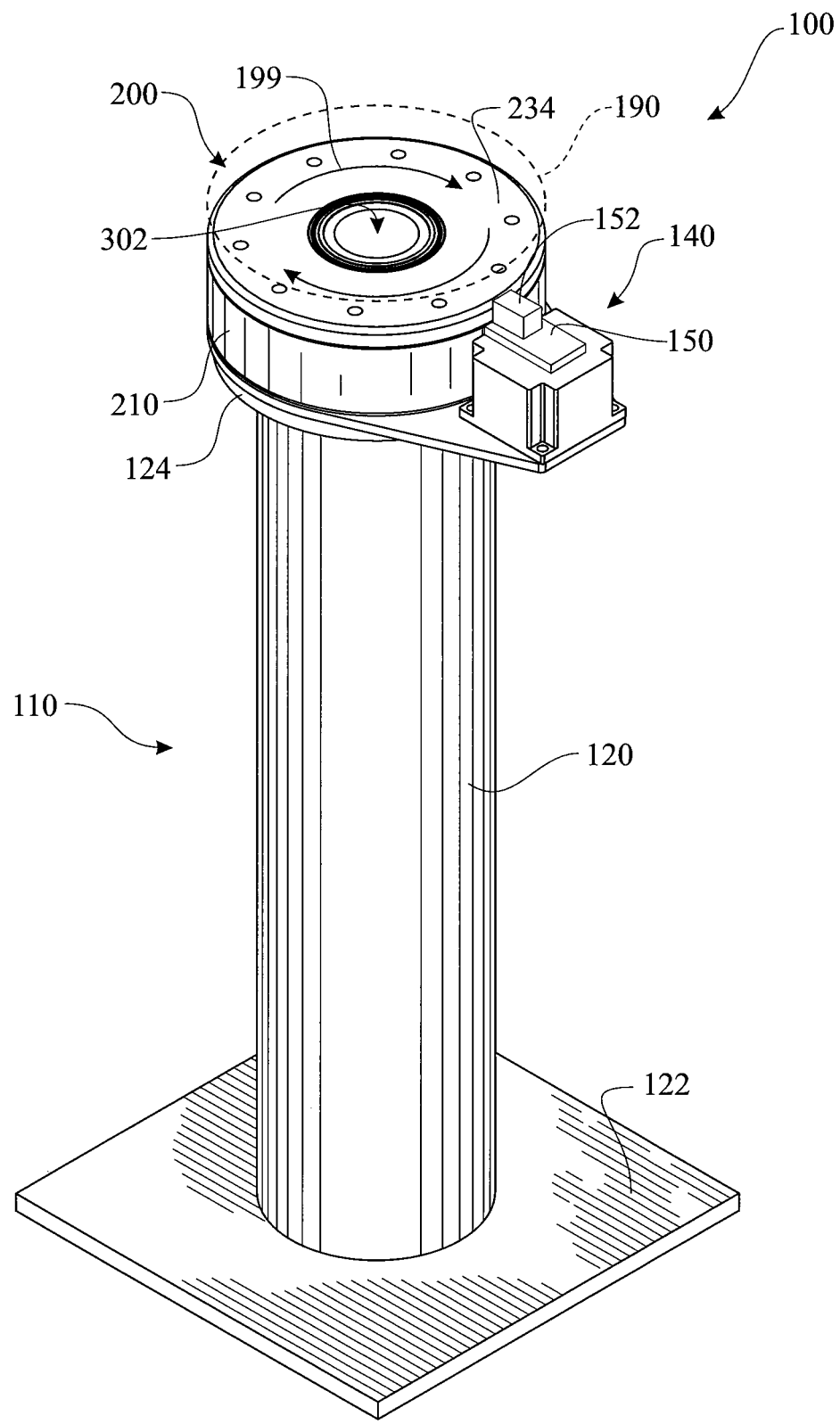
FIG. 1 presents an isometric view of an exemplary integration of a coaxial reduction gear assembly into an exemplary rotational positioning system.
Figure 2:
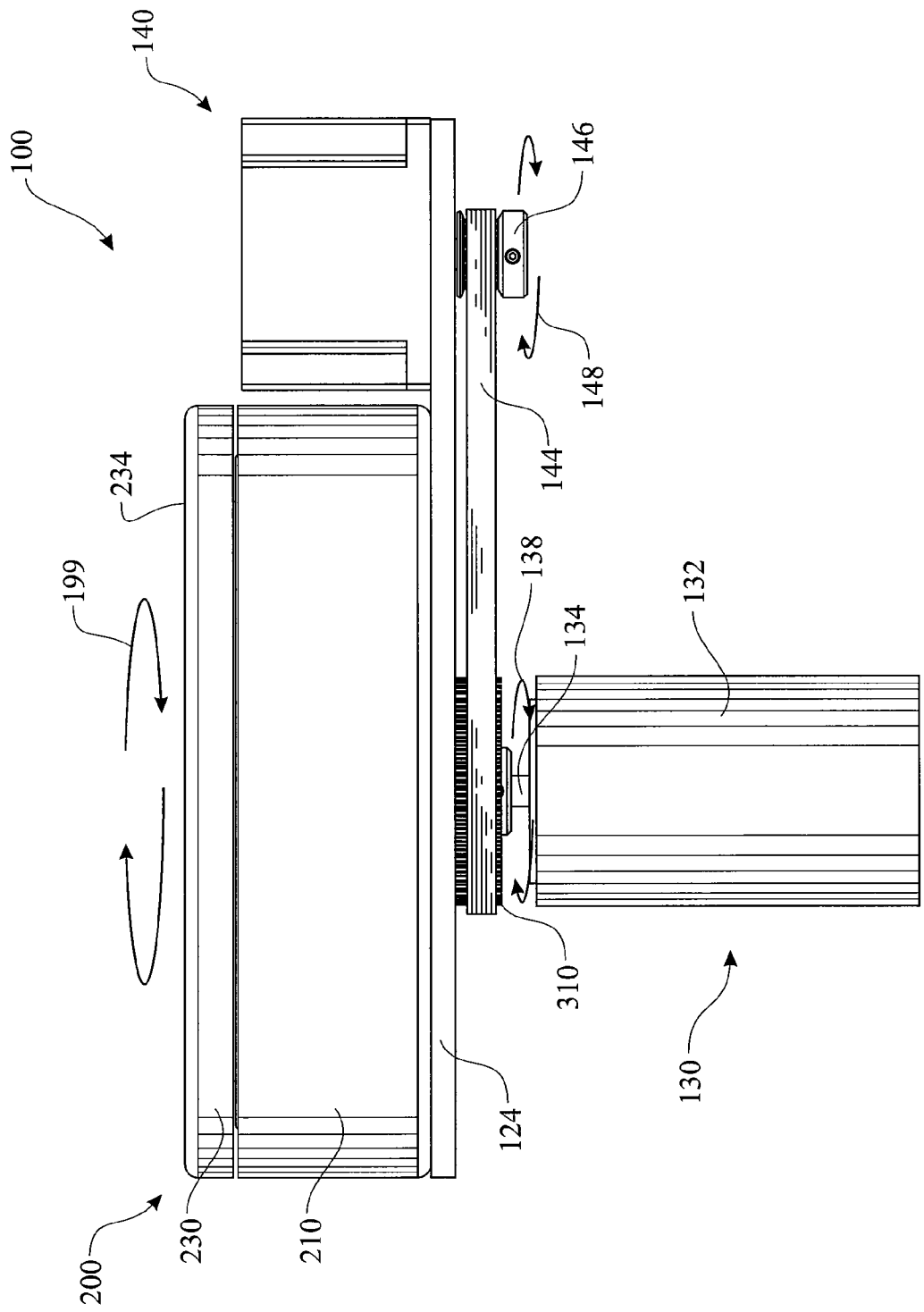
FIG. 2 presents an elevation view of the coaxial reduction gear assembly originally introduced in FIG. 1, the illustration presenting a direct drive system and an offset drive system.

An exemplary coaxial reduction gear assembly 200 is shown installed an exemplary rotational positioning system 100 in the illustrations presented in FIGS. 1 and 2. The components of the rotational positioning system 100 are supported by a support subassembly 110. The support subassembly 110 can be provided in any suitable form factor for the desired application. The support subassembly 110 would be designed to adequately support the components of the rotational positioning system 100 in the deployed environment. The rotational positioning system 100 can be employed to rotational position any equipment, including solar panels, satellite receiving antenna, telescopes, cameras, and the like. The equipment would be secured to the output gear enclosure section attachment surface 234 of the coaxial reduction gear assembly 200. The rotational positioning system 100 can include additional supporting structure to ensure stability of the subject rotating equipment. A rotational member support platform 124 can be employed to carry the coaxial reduction gear assembly 200 and respected selected rotational drive mechanism components. The rotational member support platform 124 would be supported by a vertically supporting column 120. The vertically supporting column 120 would be retained in a desired position by any suitable supporting configuration, including a support base member 122 (as illustrated), by driving the vertically supporting column 120 into the ground, designing the vertically supporting column 120 having a self supporting footing, designing the vertically supporting column 120 as a supporting framed configuration, and the like. The rotational drive mechanism can include either a direct drive configuration or an offset drive configuration. The illustrations present examples of both configurations providing rotational input to the coaxial reduction gear assembly 200.

The direct drive configuration adapts an axially registered direct drive motor assembly 130 directly or indirectly to an input gear 310 of the coaxial reduction gear assembly 200. The axially registered direct drive motor assembly 130 includes a motor axle 134 rotational driven by a motor 132. The interface between the motor axle 134 and the input gear 310 can utilize a direct coupling, wherein the motor axle 134 would be directly connected to the input gear 310 in a linear arrangement or the motor axle 134 would be coupled to the input gear 310 having an intermediate operational assembly, such as a transmission integrated therebetween. In operation, the motor 132 rotates the motor axle 134 in accordance with a direct drive motor rotation 138. The direct drive motor rotation 138 is transferred directly to the input gear 310, wherein the rotational motion is manipulated by the coaxial reduction gear assembly 200 to increase the torque and reduce the speed of the rotational motion applied to the output gear enclosure section attachment surface 234. The subject equipment 190 is assembled to the output gear enclosure section attachment surface 234, wherein the resulting torque and rotational motion drive position the subject equipment in accordance with a resultant rotational motion 199.

The offset drive configuration provides operational communication between an offset motor assembly 140 and the input gear 310 by way of a drive belt 144. An offset drive gear or pulley 146 is attached to a shaft of the offset motor assembly 140. The drive belt 144 is installed between the offset drive gear or pulley 146 and the input gear 310, wherein the drive belt 144 translates torsional energy and respective rotational motion generated by the offset motor assembly 140 to the input gear 310. In operation, the offset motor assembly 140 rotates the offset drive gear or pulley 146 in accordance with an offset motor rotation 148. The offset motor rotation 148 is transferred to the input gear 310 using the drive belt 144. The rotational motion of the input gear 310 is converted by the coaxial reduction gear assembly 200 to increase the torque and reduce the speed of the rotational motion applied to the output gear enclosure section attachment surface 234. The subject equipment is assembled to the output gear enclosure section attachment surface 234, wherein the resulting torque and rotational motion drive position the subject equipment in accordance with a resultant rotational motion 199.

The angular position of the output gear enclosure section attachment surface 234 can be monitored by a rotational positioning sensor 152. The rotational positioning sensor 152 communicates information respective to the angular position of the output gear enclosure section attachment surface 234 to a system controller 150. The system controller 150 interprets the angular position information and directs the rotational drive mechanism 130, 140 to operate, applying a torsional force to the input gear 310, which rotates the output gear enclosure section attachment surface 234 into the desired angular position.

The flexibility of the coaxial reduction gear assembly 200 enables integration thereof into virtually any rotational positioning system 100. Rotational input can be provided by any rotational drive mechanism using any known rotational translating mechanical interface, such as the drive belt 144 (as shown in FIG. 2), one or more gears, a transmission, and the like. The exemplary embodiment assembles the coaxial reduction gear assembly 200 to a rotational member support platform 124, which is supported by a vertically supporting column 120, which in turn is supported by a support base member 122.

Figure 3:
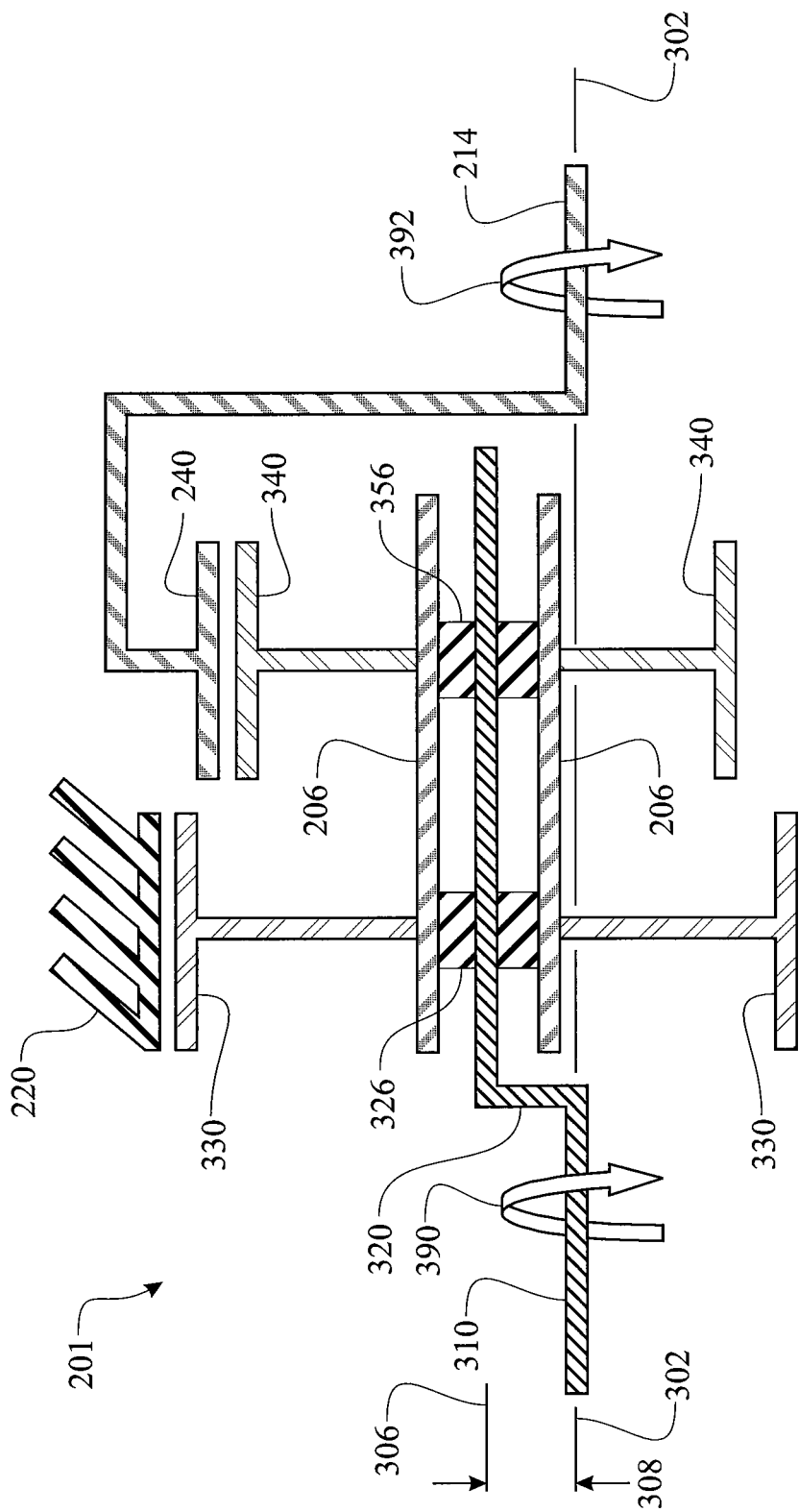
FIG. 3 presents an exemplary coaxial reduction gear schematic representative of the coaxial reduction gear assembly.

Operation of the coaxial reduction gear assembly 200 is described using the coaxial reduction gear schematic 201 presented in FIG. 3. The coaxial reduction gear assembly 200 is driven by applying an input rotational motion 390 to an input gear 310. The input gear 310 rotates a first planetary gear cam section 320 about a shaft interior 302. The cam drives a pair of planetary gear cam bearings 326, 356 about a circular path having a radius equal to a planetary gear rotational offset 308. A planet wheel gear first stage 330 is assembled to the first planetary gear cam bearing 326, enabling the planet wheel gear first stage 330 to rotate freely about a planetary gear rotational axis 306. The circular motion engages a tangential edge of a planet wheel gear first stage 330 with a mating tangential edge of a stationary gear body 220. The engagement between the planet wheel gear first stage 330 and the stationary gear body 220 causes the planet wheel gear first stage 330 to rotate about the planetary gear rotational axis 306. The planet wheel gear first stage 330 is joined to the planet wheel gear second stage 340. The rotation of the planet wheel gear first stage 330 drives rotation of the planet wheel gear second stage 340. The resulting rotational motion engages a tangential edge of a planet wheel gear second stage 340 with a mating tangential edge of an output gear body 240. A planet wheel gear first stage diameter 339 (FIG. 8) of the planet wheel gear first stage 330 differs from a planet wheel gear second stage diameter 349 (FIG. 8) of the planet wheel gear second stage 340. Additionally, the planet wheel gear first stage 330 comprises a greater number of teeth 332 (FIGS. 7 through 9) compared to a number of teeth 342 (FIGS. 7 through 9) of the planet wheel gear second stage 340. Additionally, the stationary gear body 220 has a greater number of teeth 222 (FIG. 4) compared to a number of teeth 242 (FIG. 5) of the output gear body 240. The resulting gear ratio is determined from the selected number of teeth provided about each of the gears. The resulting gear ratio determines the rate of rotation of the output gear body 240. The output gear body 240 drives rotation of the output gear enclosure section attachment surface 234 in accordance with an output rotational motion 392. Bearings (such as an input gear support bearing 316 (FIG. 14) and an input gear distal support bearing 366 (FIG. 15)) can be utilized to retain the radial position of the input gear 310 and the output gear enclosure section attachment surface 234.

The gear ratio can be calculated by applying the Willis equation. The following provides several examples of gear configurations and resulting gear ratios:

$$\frac{\omega(1) - \omega(P)}{\omega(2) - \omega(P)} = \frac{Z(2)}{Z(P2)} * \frac{Z(P1)}{Z(1)} = R(P)$$

Wherein:
ω(1)=Rotational Speed of the Stationary Gear Body 220
ω(2)=Rotational Speed of the Output Gear Body 240
ω(P)=Rotational Speed of the Planetary Gear Subassembly 204
Z(1)=Number of Teeth for the Stationary Gear 220
Z(2)=Number of Teeth for the Output Gear 240
Z(P1)=Number of Teeth of the Planet Wheel Gear First Stage 330
Z(P2)=Number of Teeth of the Planet Wheel Gear Second Stage 340
R(P)=Planetary Gear Ratio
The overall gear ratio is calculated using the following equation:

$$U = \frac{R(P)}{(R(P) - 1)}$$

Wherein:
U=Calculated Gear Ratio
R(P)=Calculated using the Willis equation
The following table presents various exemplary gear configurations and a resulting gear ratio of the system:

TABLE 1

Examples of Gear Configurations

| Gear | Number of Teeth | | | |
|---|---|---|---|---|
| | Example 1 | Example 2 | Example 3 | Example 4 |
| Z(1) | 106 | 50 | 51 | 501 |
| Z(2) | 86 | 47 | 50 | 500 |
| Z(P1) | 96 | 48 | 50 | 500 |
| Z(P2) | 76 | 45 | 49 | 499 |
| Gear Ratio (U) | 41 | 376 | 2500 | 250000 |

It is understood that the preferred difference in the number of teeth 332, 342 between the planet wheel gear first stage 330 and planet wheel gear second stage 340 would be between and inclusive of 1 through 20.

The following table demonstrates how variations in the number of teeth of the planetary gears impacts the gear ratio of the system:

TABLE 2

Examples of Affect of Constant Ring Gears and Various Planetary Gears

| Gear | Number of Teeth | | | |
|---|---|---|---|---|
| | Example 1 | Example 2 | Example 3 | |
| Z(1) | 106 | 106 | 106 | (Constant) |
| Z(2) | 105 | 105 | 105 | (Constant) |
| Z(P1) | 36 | 105 | 105 | |
| Z(P2) | 35 | 95 | 104 | |
| Gear Ratio (U) | 54 | 1008 | 11025 | |

Although the above describes a planetary gear 206 having a configuration where the number of teeth 334 of the planet wheel gear first stage 330 is greater than the number of teeth 344 of the planet wheel gear second stage 340, it is understood that the ratios can be reversed. In the opposite configuration, the number of teeth 334 of the planet wheel gear first stage 330 would be less than the number of teeth 344 of the planet wheel gear second stage 340. In this configuration, the output rotational gear enclosure section 230 would rotate in a reverse direction.

The coaxial reduction gear assembly 200 is fabricated having an enclosure comprising a stationary gear enclosure section 210 and an output rotational gear enclosure section 230, a planetary gear 206, an input shaft and planetary carrier combination 300, and a plurality of rotational bearings 316, 326, 356, 366.

The planetary gear subassembly 204 provides two distinct rotational axes, a central shaft rotational axis 304 and a planetary gear rotational axis 306. The central shaft rotational axis 304 defines a rotational axis of an input rotational motion.

The planetary gear rotational axis 306 defines a rotational axis of a pair of planetary gears of a planetary gear 206. A planetary gear rotational offset 308 engages a tangent surface of the planetary gear 206 with a respective, engaging tangent surface of the respective enclosure section 210, 230. A rotational relation between the central shaft rotational axis 304 and the planetary gear rotational axis 306 is provided by a planetary gear cam section 320, 350.

The stationary gear enclosure section 210 is formed having an enclosure circumferential wall 212 extending axially from a peripheral edge of a stationary gear enclosure section attachment surface 214 forming an interior volume 213. The enclosure circumferential wall 212 terminates at a stationary gear enclosure section mating surface 218. The stationary gear enclosure section mating surface 218 is preferably designed creating a planar surface that is perpendicular to a central axis of rotation 304. A concentrically located input shaft aperture 216 is formed through the stationary gear enclosure section attachment surface 214. The concentrically located input shaft aperture 216 is sized to snugly receive and retain an input gear support bearing 316. The central shaft rotational axis 304 is referenced as a concentric point of the concentrically located input shaft aperture 216. The enclosure circumferential wall 212 is preferably designed having a circular shape, concentric about the concentrically located input shaft aperture 216. A stationary gear body 220 is formed within an interior section 213 of the stationary gear enclosure section 210. The stationary gear body 220 includes a series of stationary gear teeth 222, wherein the stationary gear teeth 222 are equally spaced about a circumferential direction and concentrically located about the central shaft rotational axis 304. The stationary gear teeth 222 is configured as an internal gear, wherein the teeth 222 are arranged extending towards a gear center. A stationary gear enclosure section rotational bearing radial support surface 224 is formed about an interior circumference of the stationary gear enclosure section 210, extending inward from the stationary gear enclosure section mating surface 218 for receiving an enclosure bearing 250. An enclosure bearing outer peripheral surface 252 of the enclosure bearing 250 is seated against the stationary gear enclosure section rotational bearing radial support surface 224. The stationary gear enclosure section 210 includes a bearing set axial support surface 226 to retain the enclosure bearing 250 in an axial direction. Although the concentrically located input shaft aperture 216 is illustrated as an aperture, the concentrically located input shaft aperture 216 can be formed as any feature integrated into the stationary gear enclosure section 210.

A stationary gear enclosure section attachment configuration is integrated into the stationary gear enclosure section 210. The stationary gear enclosure section attachment configuration can be designed having any form factor, wherein the stationary gear enclosure section attachment configuration affixes the stationary gear enclosure section 210 to a supporting component, such as the rotational member support platform 124. The stationary gear enclosure section attachment configuration retains the stationary gear enclosure section 210 in a fixed position. The exemplary object attachment configuration includes a series of attachment apertures 215.

The output rotational gear enclosure section 230 is formed having an output gear enclosure radial surface 232 defining a peripheral edge of an output rotational gear enclosure section 230. An exterior surface of the output rotational gear enclosure section 230 can be referred to as an output gear enclosure section attachment surface 234. An interior surface of the output rotational gear enclosure section 230 provides functionality of an output gear enclosure section mating surface 238, wherein the output gear enclosure section mating surface 238 is preferably designed creating a planar surface that is perpendicular to a central axis of rotation 304 to compliment the stationary gear enclosure section mating surface 218. A concentrically located distal shaft support aperture 236 is formed through the output gear enclosure section attachment surface 234. The concentrically located distal shaft support aperture 236 is sized to snugly receive and retain a second planetary gear cam bearing 356. The central shaft rotational axis 304 is referenced as a concentric point of the concentrically located distal shaft support aperture 236. The output gear enclosure radial surface 232 is preferably designed having a circular shape, concentric about the concentrically located distal shaft support aperture 236. An output gear body 240 is formed within an interior section of the output rotational gear enclosure section 230. The output gear body 240 includes a series of output gear teeth 242, wherein the output gear teeth 242 are equally spaced about a circumferential direction and concentrically located about the central shaft rotational axis 304. The output gear teeth 242 is configured as an internal gear, wherein the teeth 242 are arranged extending towards a gear center. An output gear enclosure section rotational bearing seat surface 244 is formed having an exterior circumference proximate the output gear enclosure radial surface 232 for receiving an enclosure bearing 250. The output rotational gear enclosure section 230 includes a bearing set axial support surface 246 to retain the enclosure bearing 250 in an axial direction. An object attachment configuration is integrated into the output rotational gear enclosure section 230. The object attachment configuration can be designed having any form factor, wherein the object attachment configuration joins the subject equipment 190 to the output rotational gear enclosure section 230 and the output rotational gear enclosure section 230 rotates the attached subject equipment 190. The exemplary object attachment configuration includes a series of attachment apertures 235.

Figure 6:
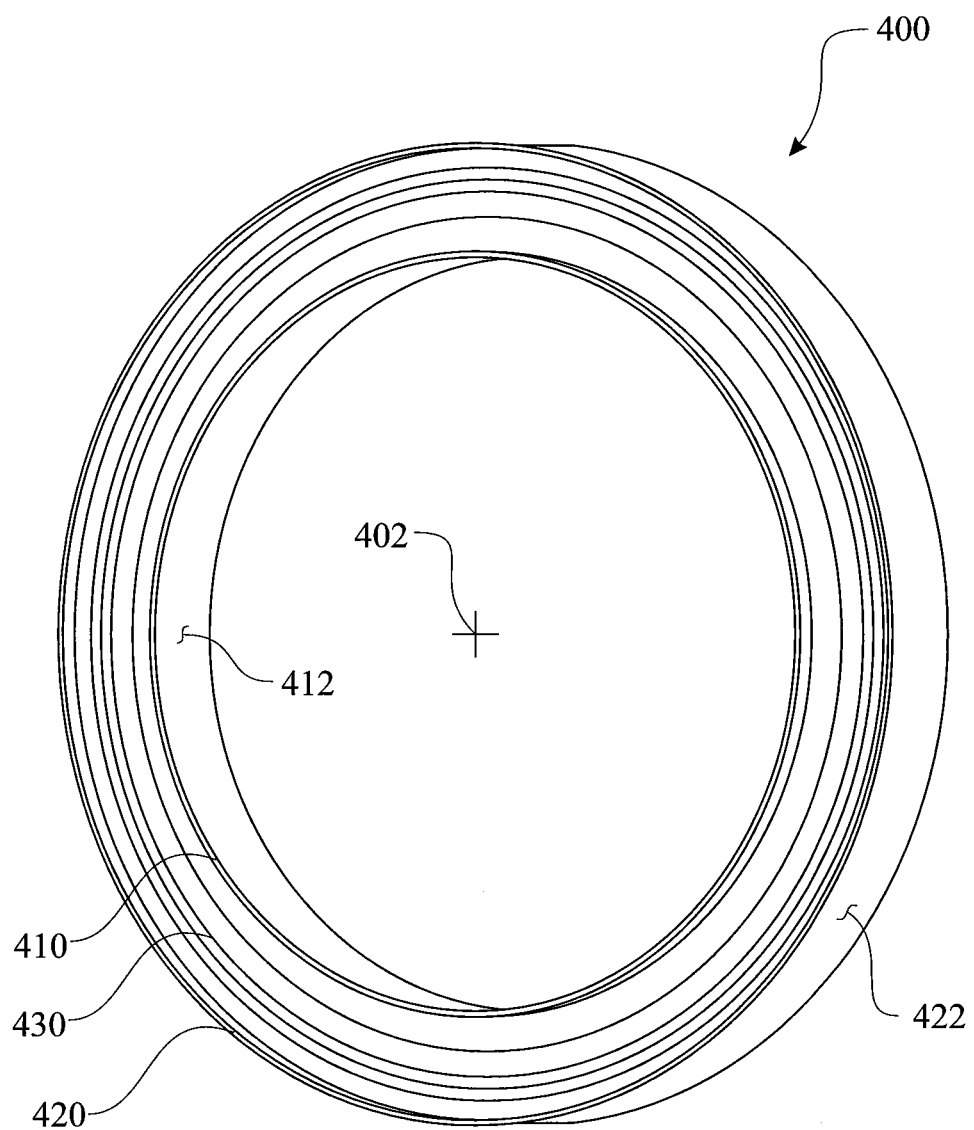
FIG. 6 presents an axial isometric view of an exemplary rotational bearing, wherein the exemplary rotational bearing is representative of multiple bearings integrated within the coaxial reduction gear assembly.

The planetary gear subassembly 204 includes an input shaft and planetary carrier combination 300, a planetary gear 206, and a series of rotational bearings 316, 326, 356, 366. Features of the rotational bearings 316, 326, 356, 366 are presented in a representative bearing 400 illustrated in FIG. 6. Each bearing comprises an inner bearing ring 410 and an outer bearing ring 420 rotationally coupled to one another about a bearing rotational center 402. The rotational engagement between the inner bearing ring 410 and outer bearing ring 420 preferably comprises a series of rolling elements. Alternative rotational interfaces can be provided between the inner bearing ring 410 and outer bearing ring 420, including a frictional interface or any other suitable interface known by those skilled in the art. The interface between the inner bearing ring 410 and outer bearing ring 420 can be protected by including a bearing seal 430 on each side of the bearing 400. An exposed, inner surface of the inner bearing ring 410 defines an inner bearing assembly peripheral surface 412. An exposed, outer surface of the outer bearing ring 420 defines an inner bearing assembly peripheral surface 424. The inner bearing assembly peripheral surface 412 engages with an outer diameter support surface of a first element. The inner bearing assembly peripheral surface 424 engages with an inner diameter support surface of a second element. The typical bearing assembly 400 provides a low resistance rotation between the first element and the second element.

Figure 7:
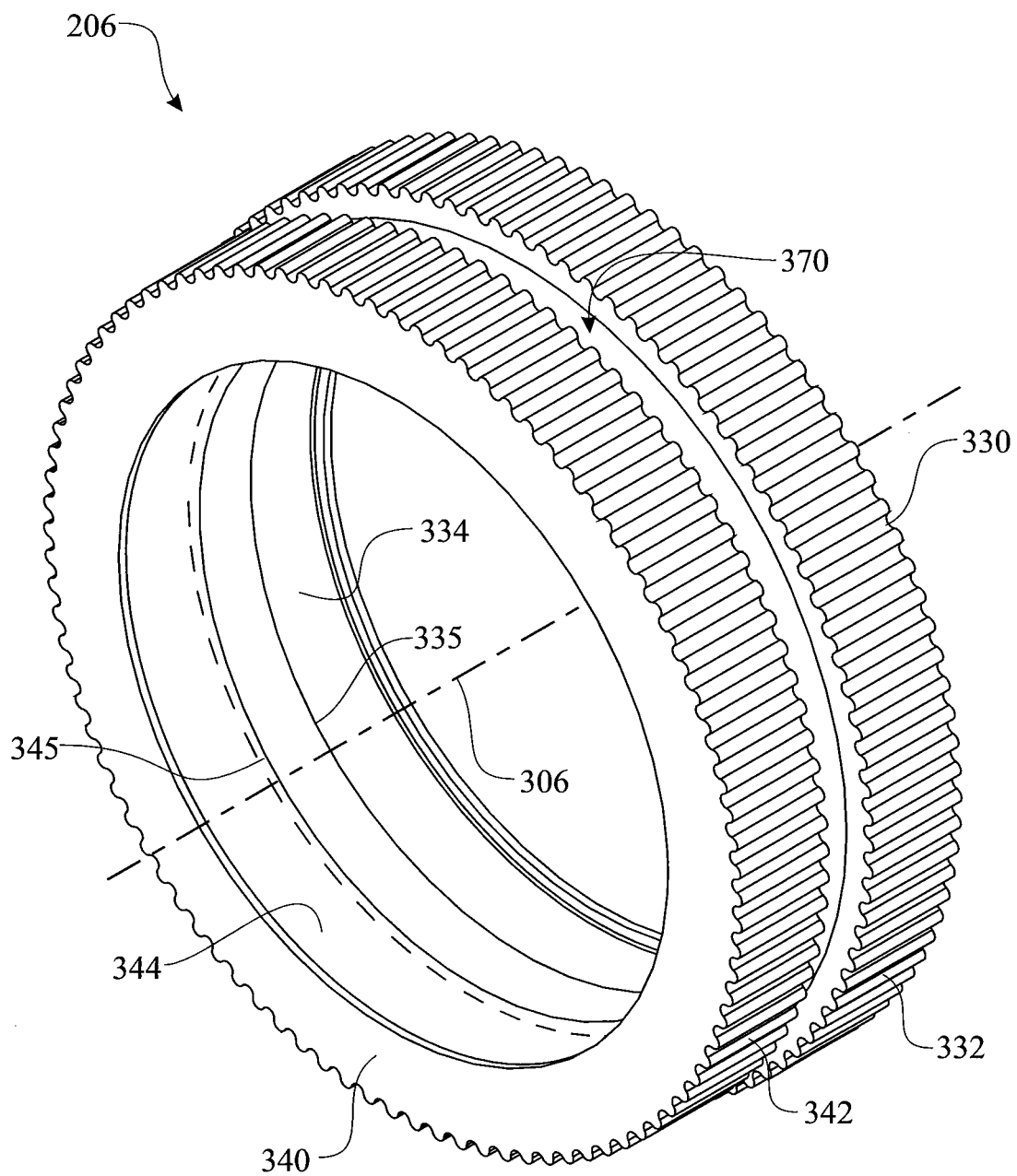
FIG. 7 presents an isometric axial view of an exemplary planetary gear configuration for use within the coaxial reduction gear assembly.
Figure 8:
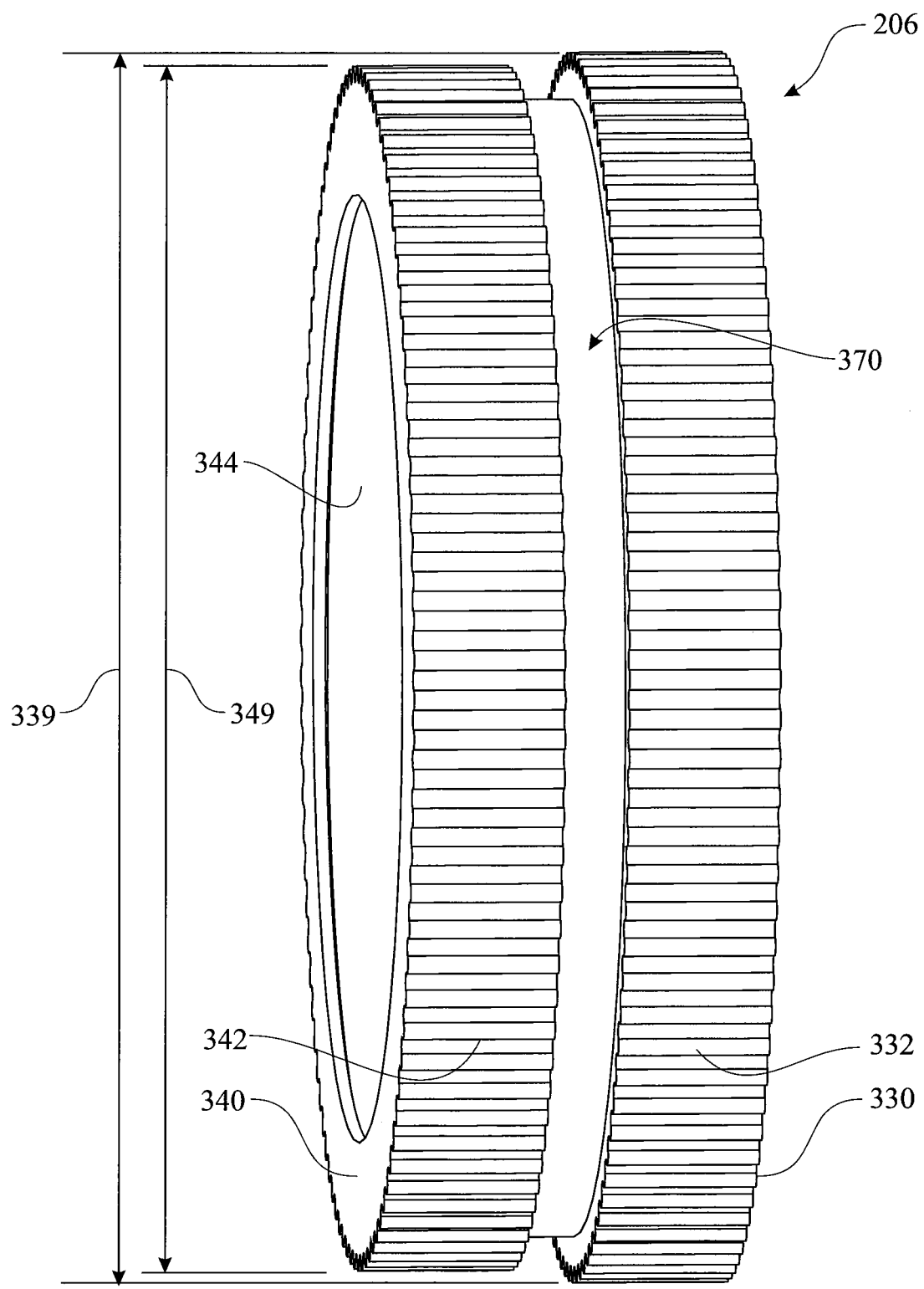
FIG. 8 presents an isometric side view of the exemplary planetary gear configuration, wherein the illustration introduces a spatial arrangement between a first planetary wheel gear and a second planetary wheel gear.
Figure 9:
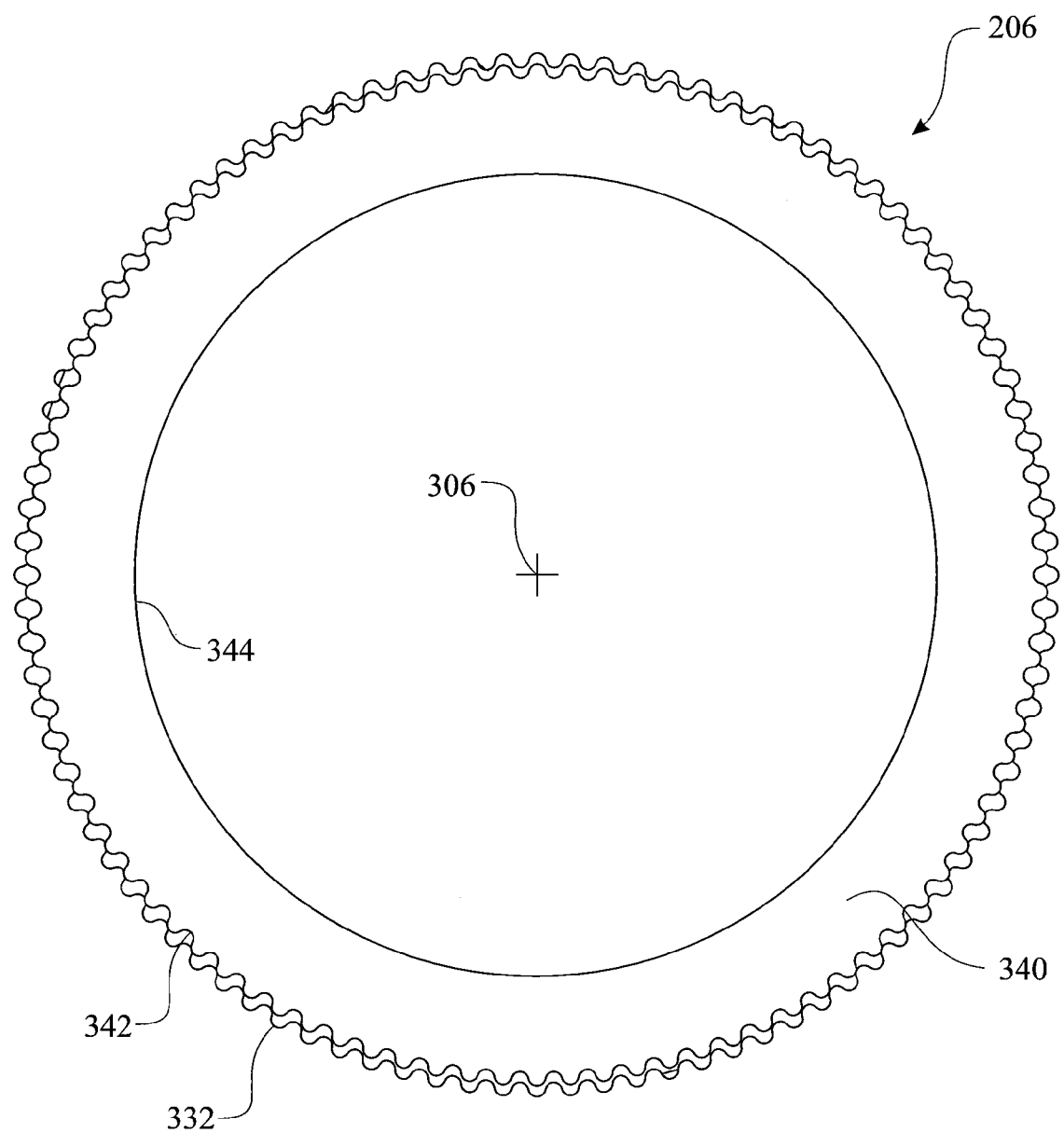
FIG. 9 presents an axial elevation view of the exemplary planetary gear configuration, wherein the illustration details differences between the first planetary wheel gear and the second planetary wheel gear.
Figure 10:
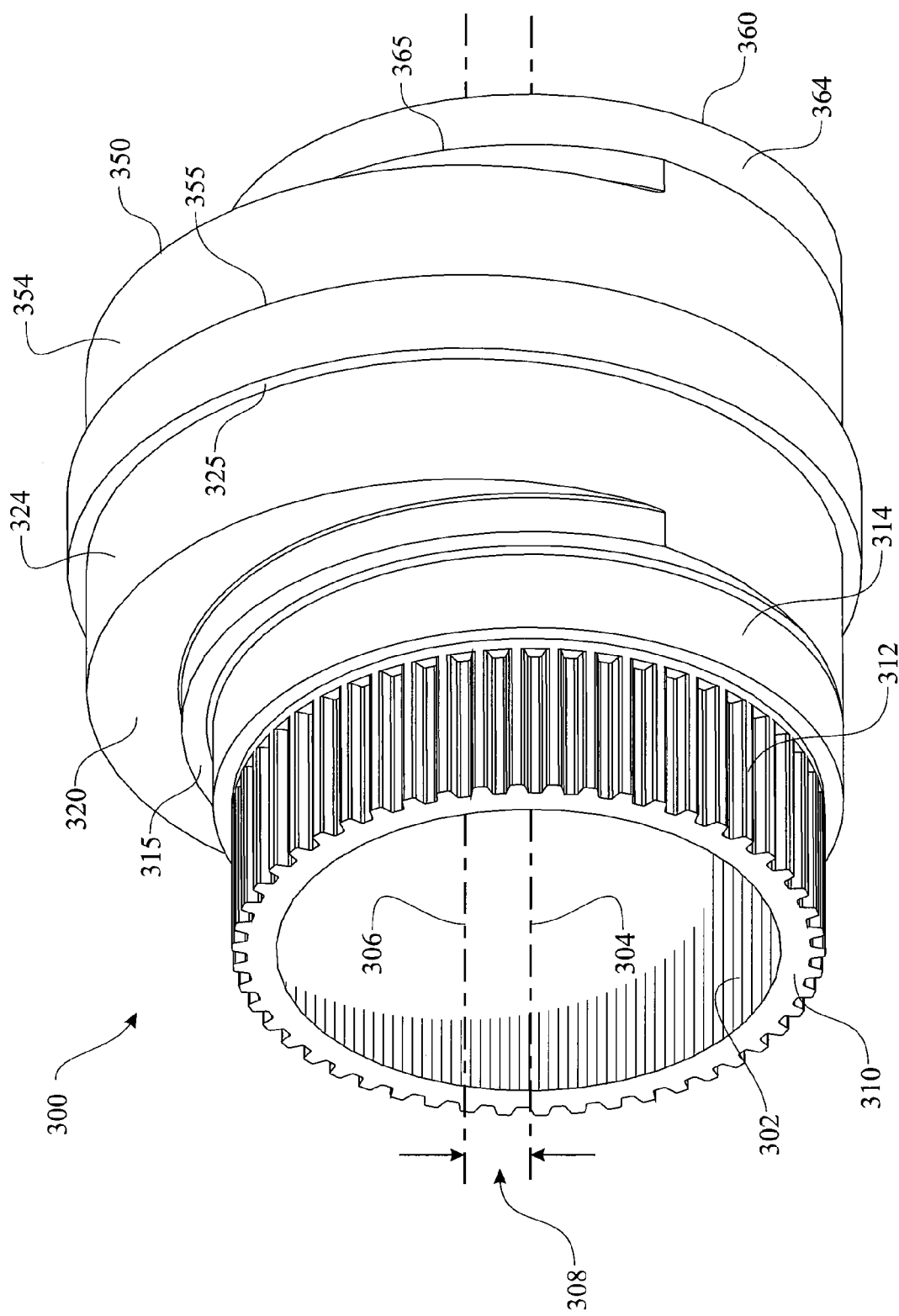
FIG. 10 presents an isometric view of an exemplary input shaft and planetary carrier combination, the view being presented from an input gear side thereof.
Figure 11:
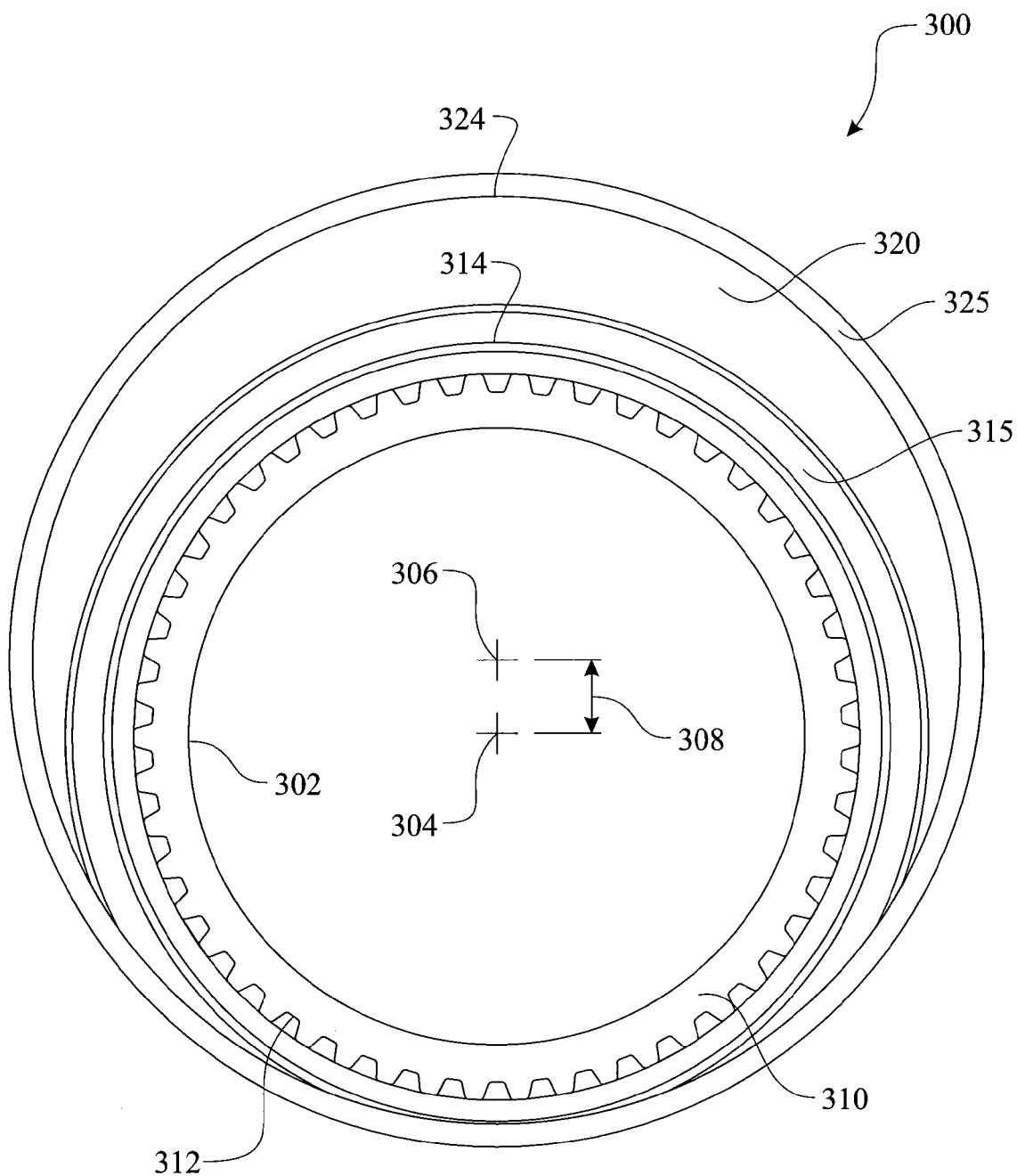
FIG. 11 presents an elevation input end view of the exemplary input shaft and planetary carrier combination, the view being presented from an input gear side thereof.
Figure 12:
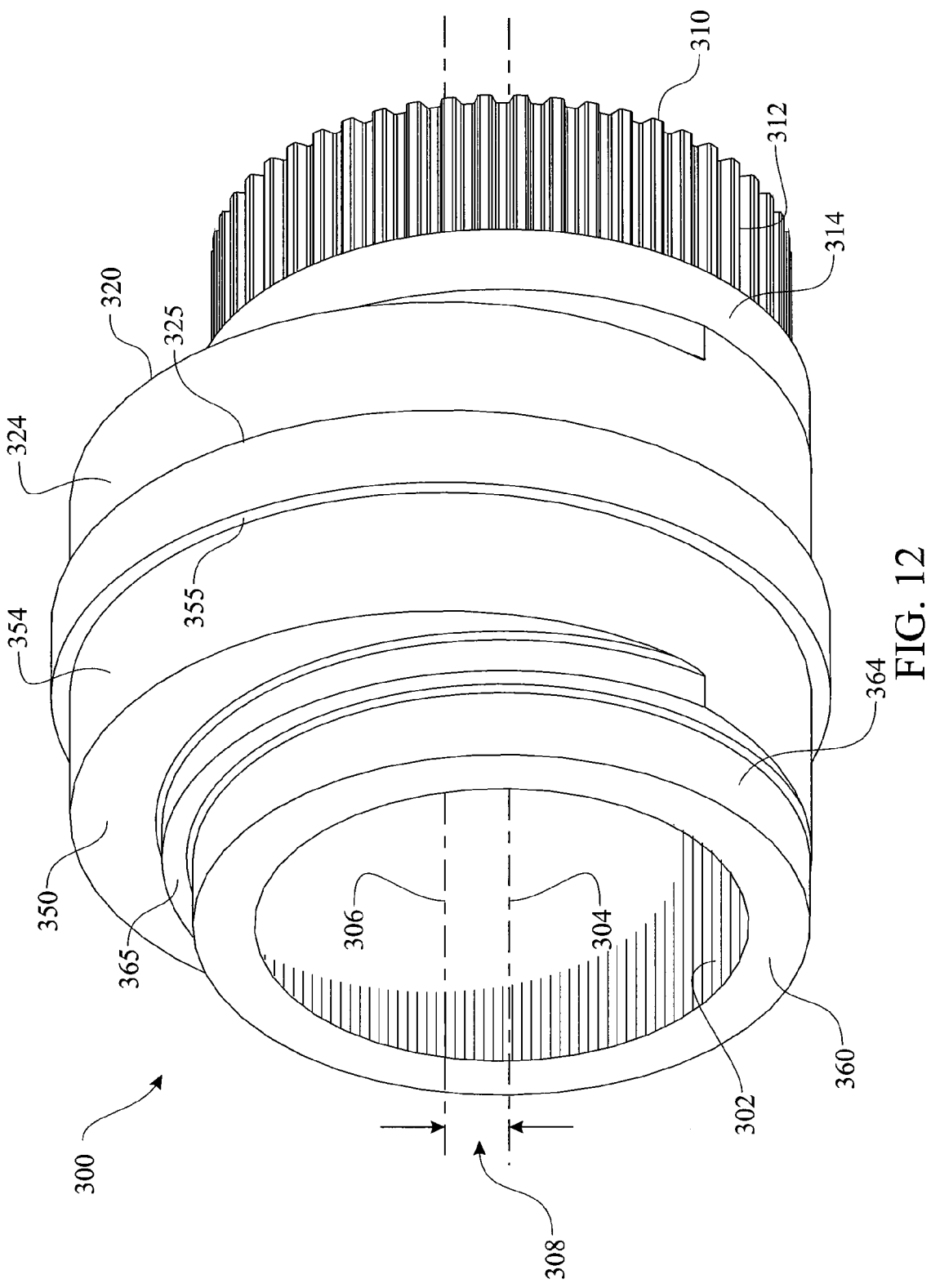
FIG. 12 presents an isometric view of the exemplary input shaft and planetary carrier combination, the view being presented from an input gear distal support side thereof.
Figure 13:
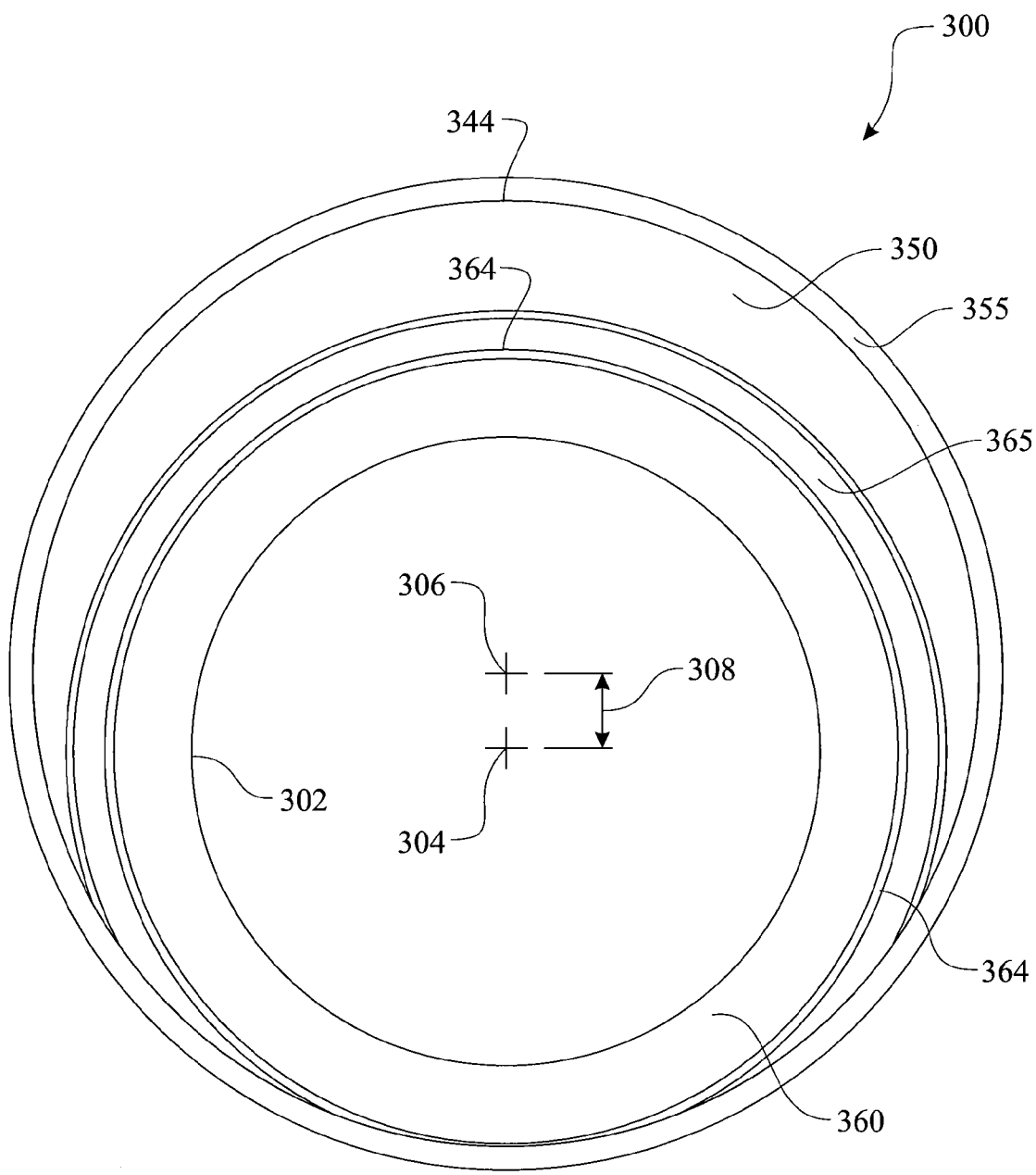
FIG. 13 presents an elevation input end view of the exemplary input shaft and planetary carrier combination, the view being presented from an input gear distal support side thereof.

The planetary gear 206 is preferably fabricated of a unitary element, as illustrated in FIGS. 7 through 9. The planetary gear 206 includes a planet wheel gear first stage 330 and a planet wheel gear second stage 340. Functionality of the coaxial reduction gear assembly 200 is provided by the difference between the planet wheel gear first stage 330 and planet wheel gear second stage 340. Each of the planet wheel gear first stage 330 and planet wheel gear second stage 340 has an annular shape defined by an inner peripheral surface. The inner peripheral surface of the planet wheel gear first stage 330 provides a planet wheel gear first stage bearing seat surface 334 for radially supporting a first planetary gear cam bearing 326. Axial retention of the first planetary gear cam bearing 326 is provided by a planet wheel gear first stage bearing axial support surface 335, which is provided by a radially arranged surface of a formation extending inward from a central section of the inner peripheral surface of the planetary gear 206. The inner peripheral surface of the planet wheel gear second stage 340 provides a planet wheel gear second stage bearing radial support surface 344 for radially supporting a second planetary gear cam bearing 356. Axial retention of the second planetary gear cam bearing 356 is provided by a planet wheel gear second stage bearing axial support surface 345, which can be provided by an opposite radially arranged surface of the formation extending inward from the central section of the inner peripheral surface of the planetary gear 206. The planet wheel gear first stage 330 and planet wheel gear second stage 340 are separated by a planetary gear gap 370. The planetary gear gap 370 ensures adequate engagement between the planet wheel gear first stage teeth 332 and the stationary gear teeth 222 and the planet wheel gear second stage teeth 342 and the output gear teeth 242 without causing interference or binding therebetween.

The inner peripheral surfaces of the planet wheel gear first stage 330 and planet wheel gear second stage 340 preferably have the same dimensions. Several differences between the planet wheel gear first stage 330 and the planet wheel gear second stage 340 create the functionality of the coaxial reduction gear assembly 200. The planet wheel gear first stage diameter 339 of the planet wheel gear first stage 330 is slightly larger than the planet wheel gear second stage diameter 349 of the planet wheel gear second stage 340. The number of planet wheel gear first stage teeth 332 of the planet wheel gear first stage 330 is slightly greater than the number of planet wheel gear second stage teeth 342 of the planet wheel gear second stage 340. The slight difference in the number of teeth causes a relational difference in motion between the stationary gear teeth 222 and the output gear teeth 242. Since the enclosure circumferential wall 212 is restrained from moving, the resultant relational difference between the stationary gear teeth 222 and the output gear teeth 242 rotates the output rotational gear enclosure section 230.

Figure 14:
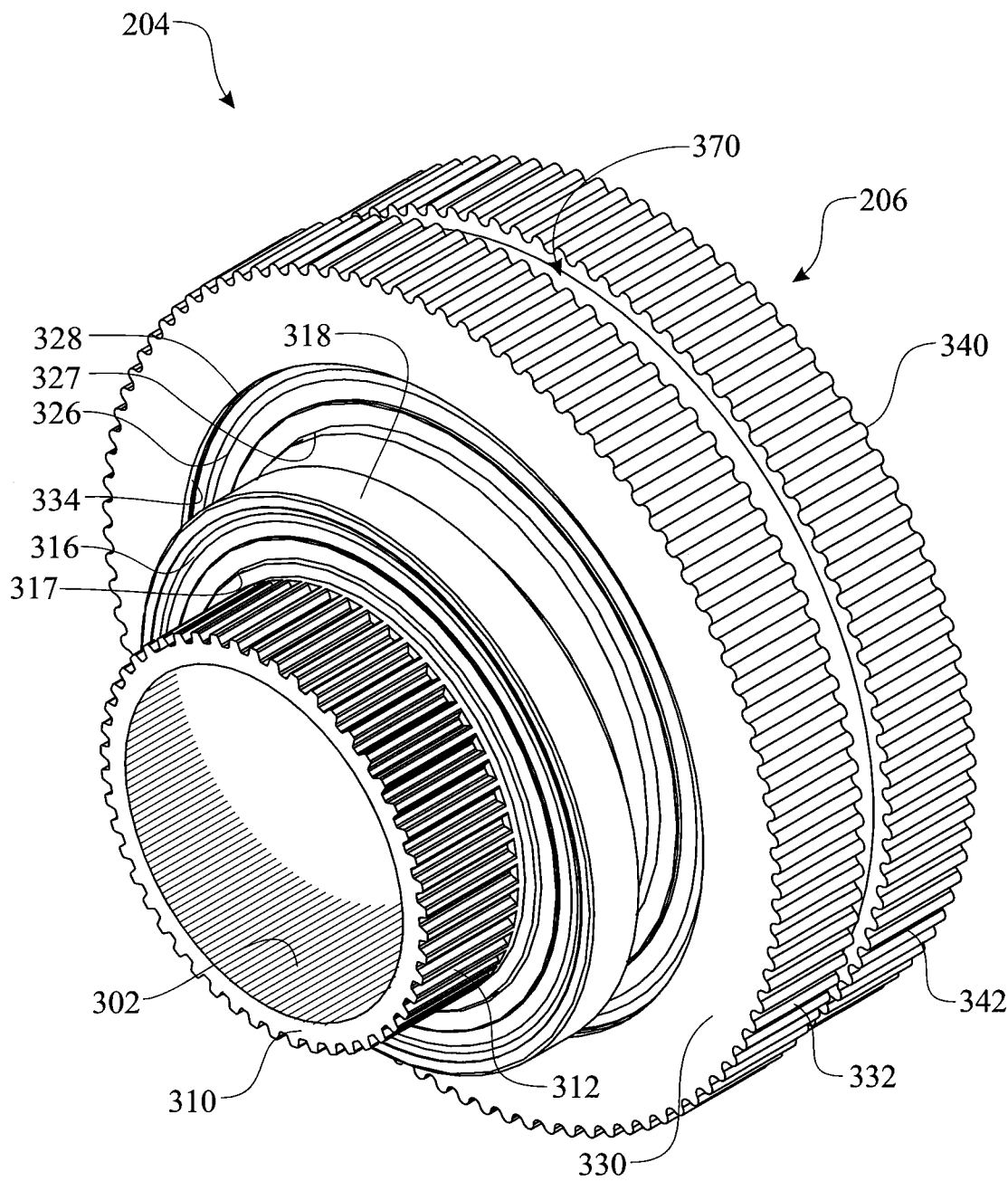
FIG. 14 presents an isometric view of an exemplary planetary gear subassembly, the exemplary planetary gear subassembly integrating the input shaft and planetary carrier combination, a series of rotational bearings, and the planetary gear configuration, wherein the view is taken from the input side of the subassembly.

The input shaft and planetary carrier combination 300 is preferably fabricated of a unitary element, as illustrated in FIGS. 10 through 13. The input gear 310 is formed at an input end of the input shaft and planetary carrier combination 300. The input gear 310 can be provided in any form factor suitable for engaging with the selected rotational drive mechanism. In the exemplary embodiment the input gear 310 includes a series of input gear teeth 312 spatially arranged about an exterior surface of the input gear 310, wherein the series of input gear teeth 312 are concentric about the central shaft rotational axis 304. An input gear bearing radial support surface 314 is formed adjacent to the input gear 310, wherein the input gear bearing radial support surface 314 is sized and shaped to support an input gear support bearing 316. The input gear bearing radial support surface 314 preferably of a circular shape having a diameter equal to a diameter of an input gear support bearing inner ring surface 317 (FIG. 14).

Figure 15:
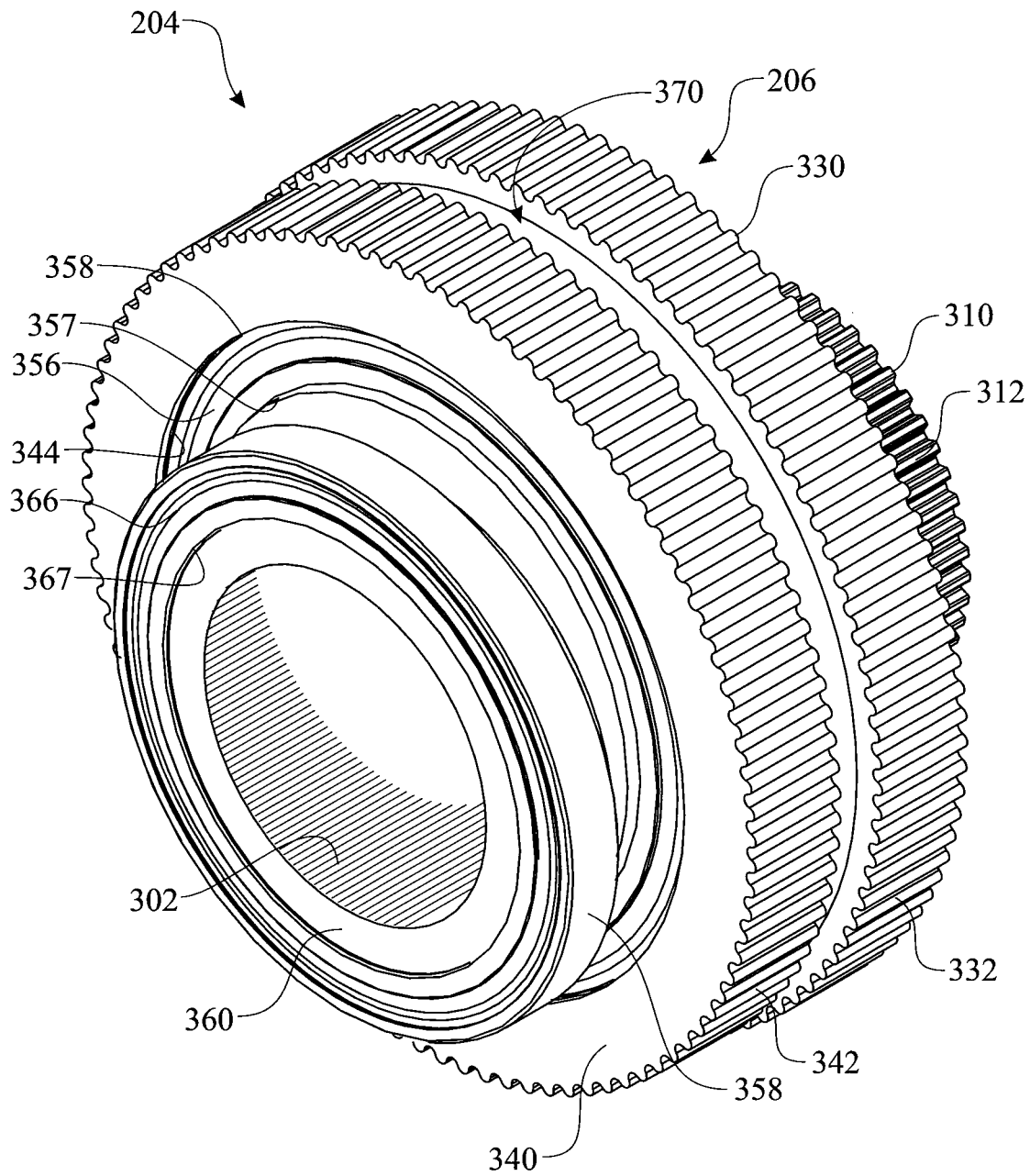
FIG. 15 presents an isometric view of the exemplary planetary gear subassembly, wherein the view is taken from the output side of the subassembly.
Figure 16:
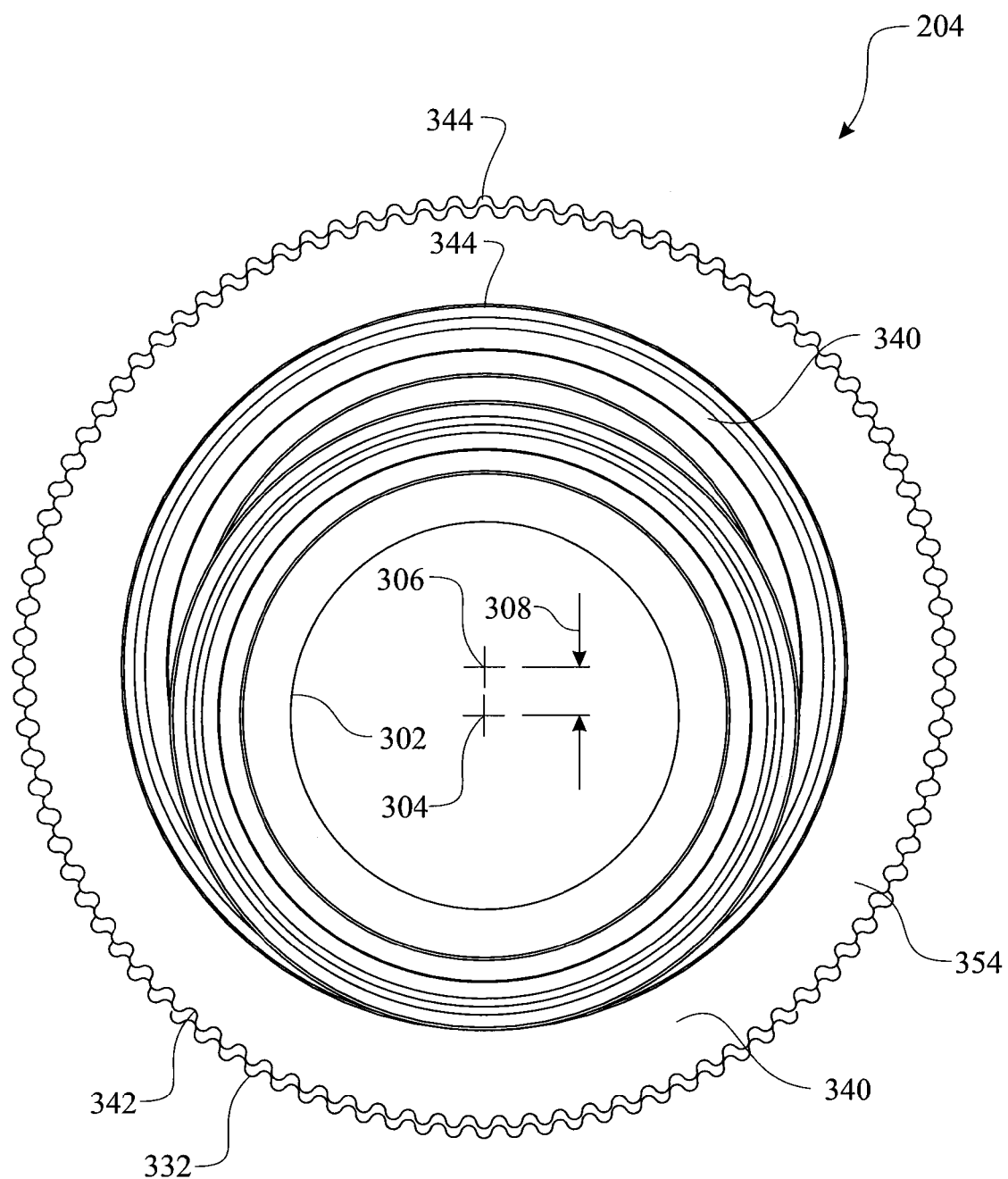
FIG. 16 presents an axial output end view of the exemplary planetary gear subassembly, wherein the view details the relationship between a central rotational axis and a planetary gear rotational axis.
Figure 17:
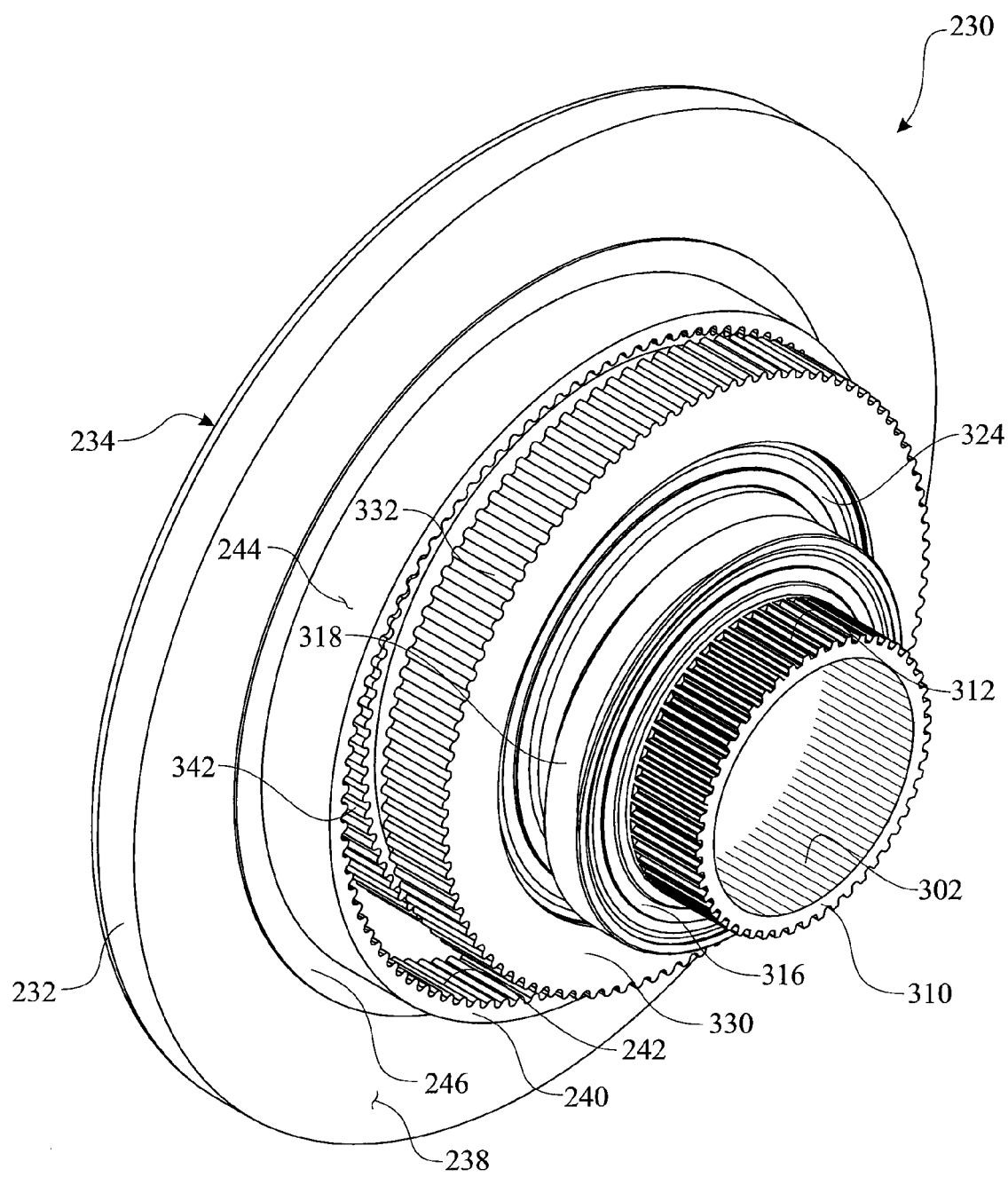
FIG. 17 presents an isometric view illustrating the exemplary planetary gear subassembly as installed within an output rotational gear enclosure section.
Figure 18:
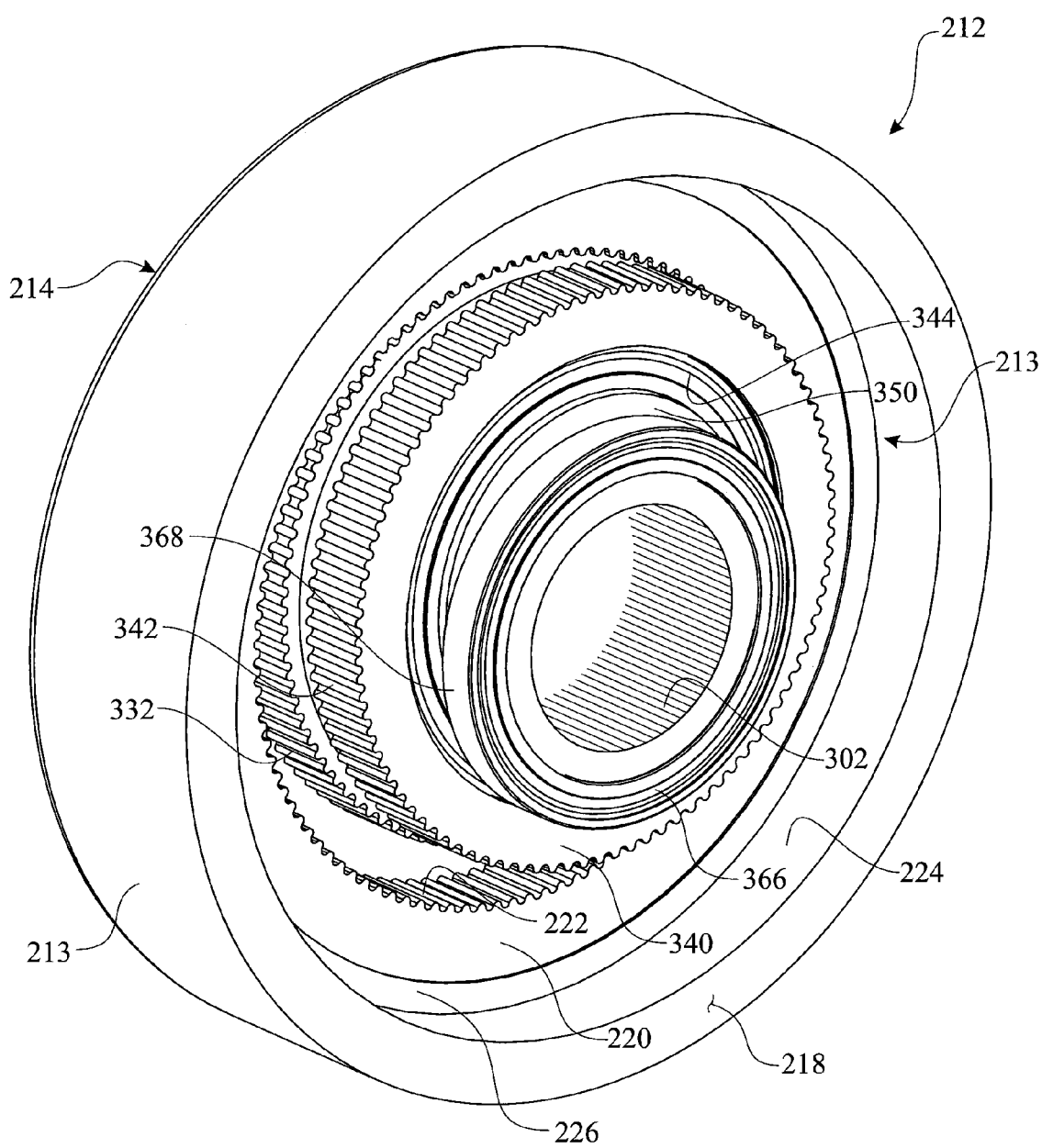
FIG. 18 presents an isometric view illustrating the exemplary planetary gear subassembly as installed within a stationary gear enclosure section.

An input gear bearing axial support surface 315 provides axial support to the input gear support bearing 316. An input gear distal support end 360 is formed at an opposite, distal end of the input shaft and planetary carrier combination 300. The input gear distal support end 360 is concentric about the central shaft rotational axis 304. An input gear distal support bearing radial support surface 364 is formed adjacent to the input gear distal support end 360, wherein the input gear distal support bearing radial support surface 364 is sized and shaped to support an input gear distal support bearing 366. The input gear distal support bearing radial support surface 364 preferably of a circular shape having a diameter equal to a diameter of an input gear distal support bearing inner ring surface 367 (FIG. 15). An input gear distal support bearing, axial support surface 365 provides axial support to the input gear distal support bearing 366. The input gear support bearing 316 and input gear distal support bearing 366 rotationally support the input shaft and planetary carrier combination 300 within the stationary gear enclosure section 210 and output rotational gear enclosure section 230 respectively by seating the input gear support bearing 316 within the concentrically located input shaft aperture 216 and seating the input gear distal support bearing 366 within the concentrically located distal shaft support aperture 236.

The input shaft and planetary carrier combination 300 provides a planetary function to the planetary gear 206 by a pair of planetary gear cam sections 320, 350. Each planetary gear cam section 320, 350 comprises a respective planetary gear cam bearing radial support surface 324, 354. A bearing inner ring surface of the first planetary gear cam bearing 326 is radially supported by the first planetary gear cam bearing radial support surface 324. The first planetary gear cam bearing 326 is retained in an axial position by a first planetary gear cam bearing axial support surface 325. A bearing inner ring surface of the second planetary gear cam bearing 356 is radially supported by the second planetary gear cam bearing radial support surface 354. The second planetary gear cam bearing 356 is retained in an axial position by a second planetary gear cam bearing axial support surface 355.

The coaxial reduction gear assembly 200 can be designed considering a number of variants. The input shaft and planetary carrier combination 300 can be solid or hollowed by including a shaft interior 302 to reduce rotational weight. It is understood that the input gear 310 and input gear distal support end 360 can be reversed on the input shaft and planetary carrier combination 300, orienting the input gear 310 passing through the concentrically located distal shaft support aperture 236 of the output rotational gear enclosure section 230.

The input gear distal support end 360 does not require a passage through the supporting member, wherein the supporting member can be either the stationary gear enclosure section 210 or output rotational gear enclosure section 230 based upon the designed orientation of the input gear 310. Therefore, the concentrically located distal shaft support aperture 236 can be provided as any suitable feature within an interior of the supporting member to adequately support and retain the input gear distal support bearing 366.

Assembly of the planetary gear subassembly 204 is accomplished by positioning the input shaft and planetary carrier combination 300 through an inner circumference of the planetary gear 206. The first planetary gear cam bearing 326 is installed between the first planetary gear cam section 320 and the planet wheel gear first stage 330 engaging the first planetary gear cam bearing inner ring surface 327 with the first planetary gear cam bearing radial support surface 324 and the first planetary gear cam bearing outer peripheral surface 328 with the planet wheel gear first stage bearing seat surface 334.

The first planetary gear cam bearing 326 is seated axially against the first planetary gear cam bearing axial support surface 325. The second planetary gear cam bearing 356 is installed between the second planetary gear cam section 350 and the planet wheel gear second stage 340 engaging the second planetary gear cam bearing inner ring surface 357 with the second planetary gear cam bearing radial support surface 354 and the second planetary gear cam bearing outer peripheral surface 358 with the planet wheel gear second stage bearing radial support surface 344.

Once the cam bearings 326, 356 are properly assembled to the planetary gear subassembly 204, the axial support bearings 316, 366 are installed. The input gear support bearing 316 is slideably assembled to the input end of the input shaft and planetary carrier combination 300 by sliding the input gear support bearing inner ring surface 317 onto the input gear bearing radial support surface 314 until the input gear support bearing 316 contacts the input gear bearing axial support surface 315. The input gear distal support bearing 366 is slideably assembled to the distal support end of the input shaft and planetary carrier combination 300 by sliding the input gear distal support bearing inner ring surface 367 onto the input gear distal support bearing radial support surface 364 until the input gear distal support bearing 366 contacts the input gear distal support bearing axial support surface 365.

Figure 4:
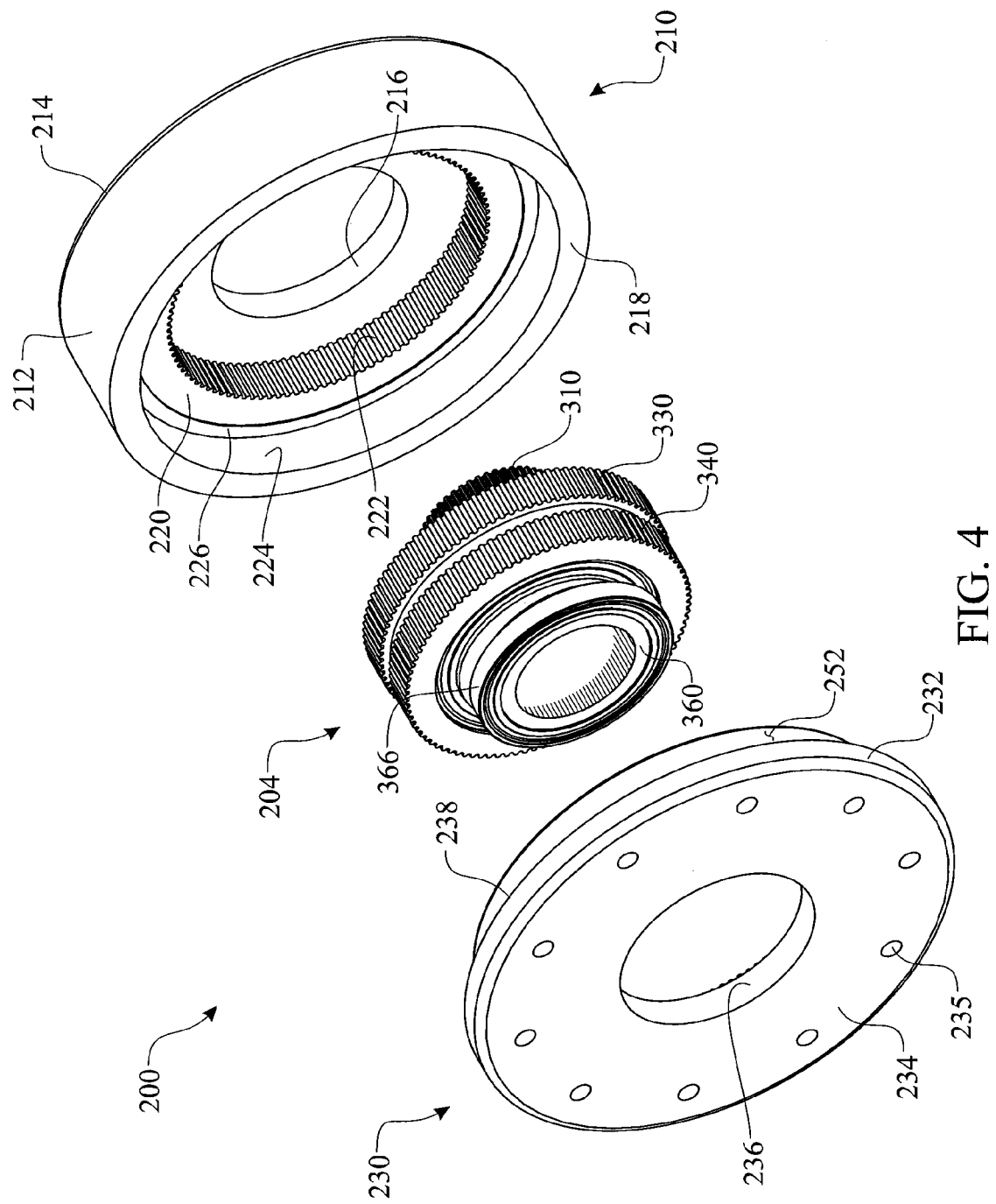
FIG. 4 presents an isometric partially exploded assembly view of the coaxial reduction gear assembly, the view taken from an output side thereof.
Figure 5:
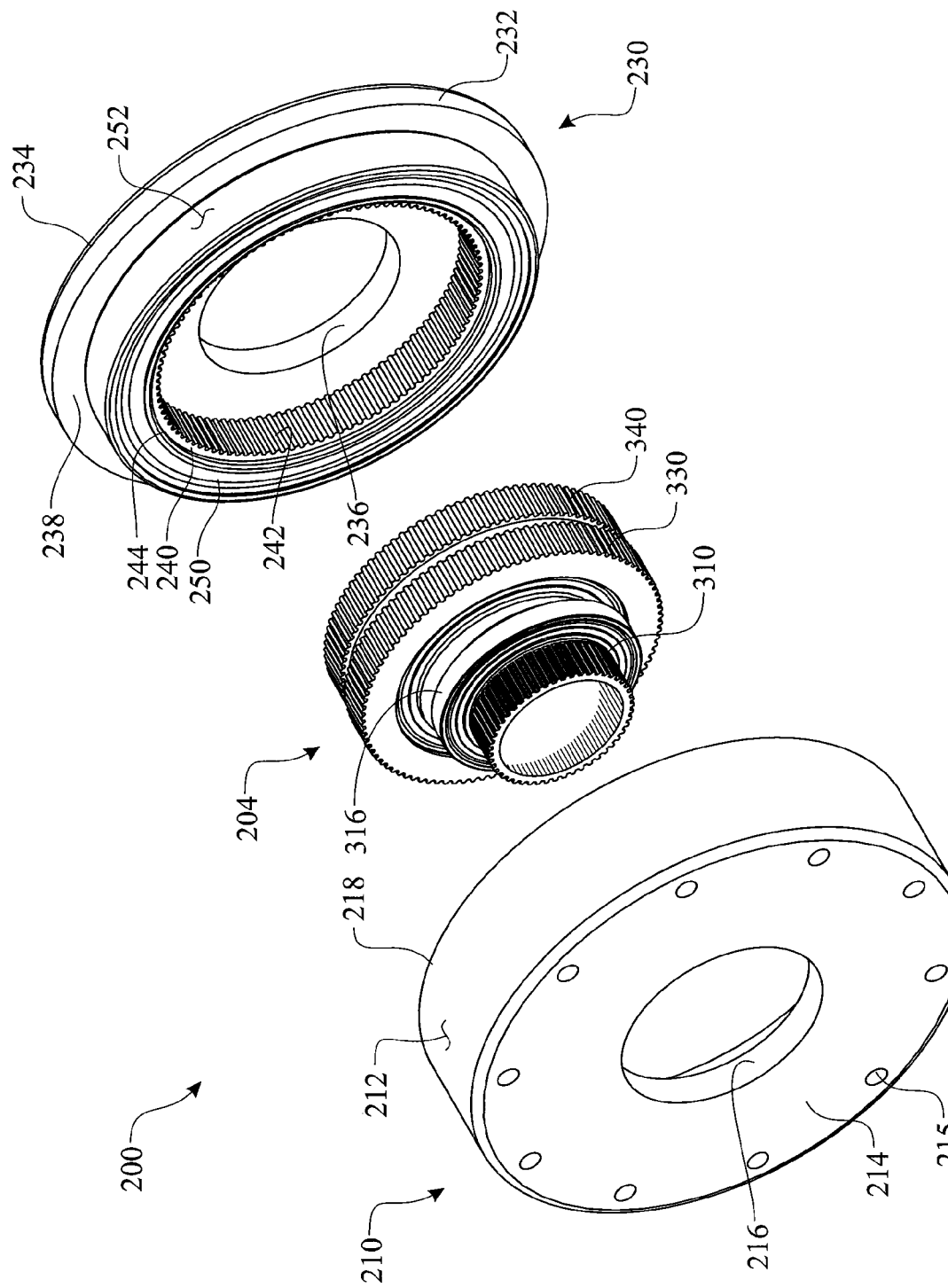
FIG. 5 presents an isometric partially exploded assembly view of the coaxial reduction gear assembly, the view taken from a fixed, input side thereof.

The planetary gear subassembly 204 is sandwiched between the stationary gear enclosure section 210 and output rotational gear enclosure section 230. The input bearing outer peripheral surface 318 is inserted into and seated within the concentrically located input shaft aperture 216 of the stationary gear enclosure section 210 (FIG. 5). The planet wheel gear first stage teeth 332 interlace with the stationary gear teeth 222. The input gear distal support bearing outer peripheral surface 368 is inserted into and seated within the concentrically located distal shaft support aperture 236 of the output rotational gear enclosure section 230 (FIG. 4). The planet wheel gear second stage teeth 342 interlace with the output gear teeth 242. The axial support bearings 316, 366 enable free rotation of the planetary gear subassembly 204 about the central shaft rotational axis 304. The cam bearings 326, 356 enable free rotation of the planetary gear 206 about the planetary gear rotational axis 306.

Figure 19:
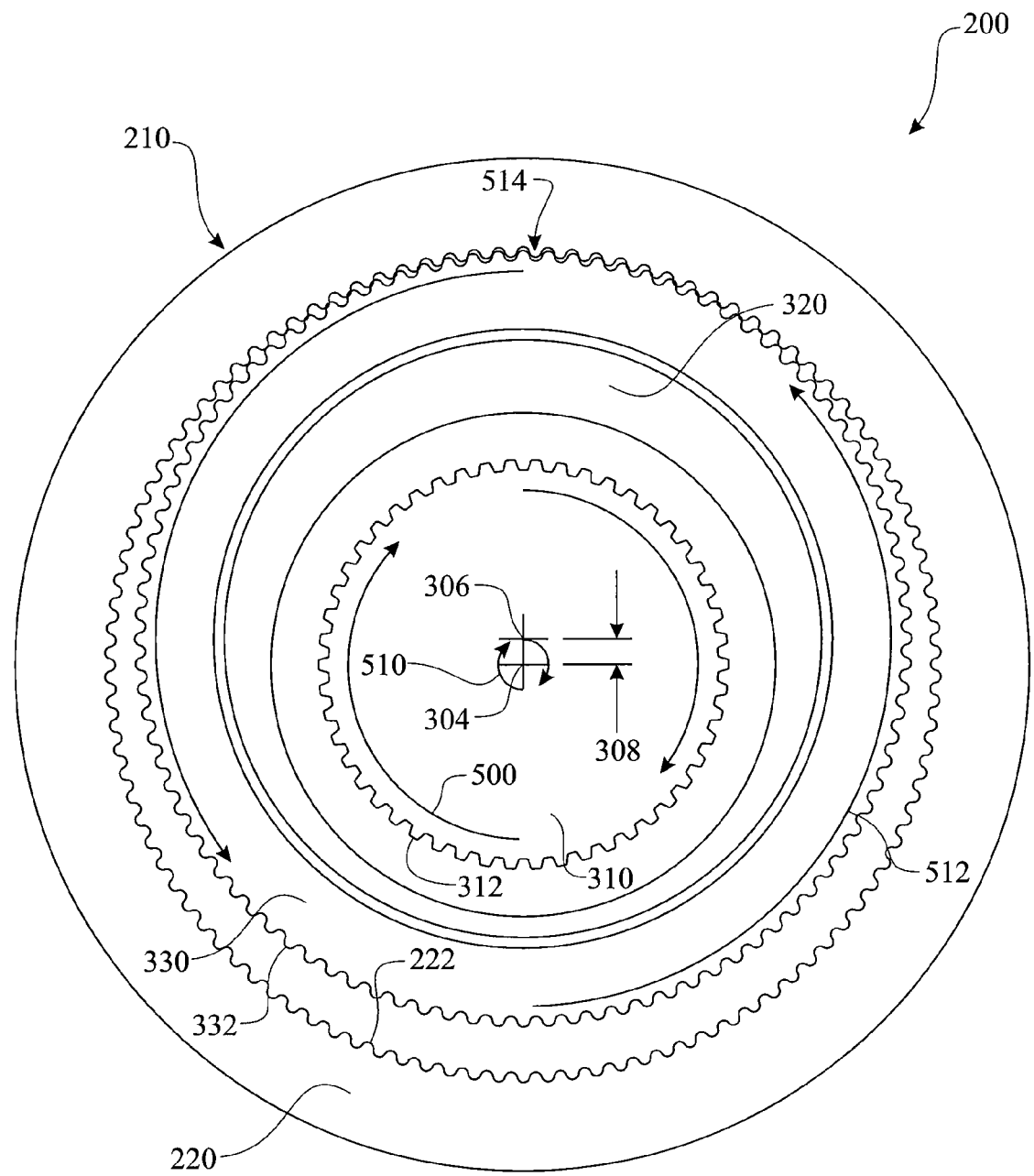
FIG. 19 is an exemplary plan view illustrating operation of a first operative portion of a coaxial reduction gear assembly in engagement with a fixed gear.
Figure 20:
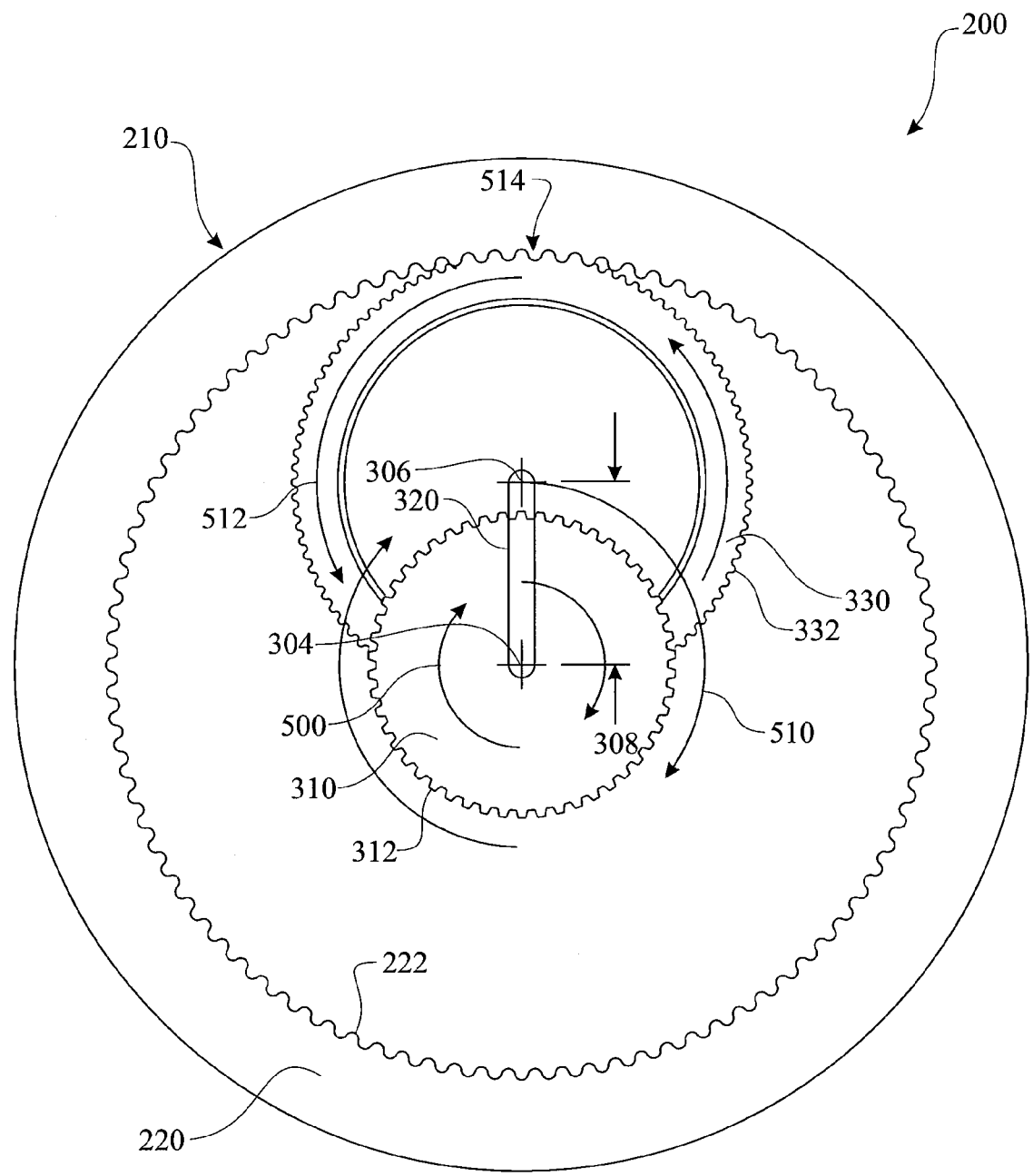
FIG. 20 is an exemplary exaggerated schematic demonstrating the components of operation of the first operative portion of the coaxial reduction gear assembly in engagement with the fixed gear.
Figure 21:
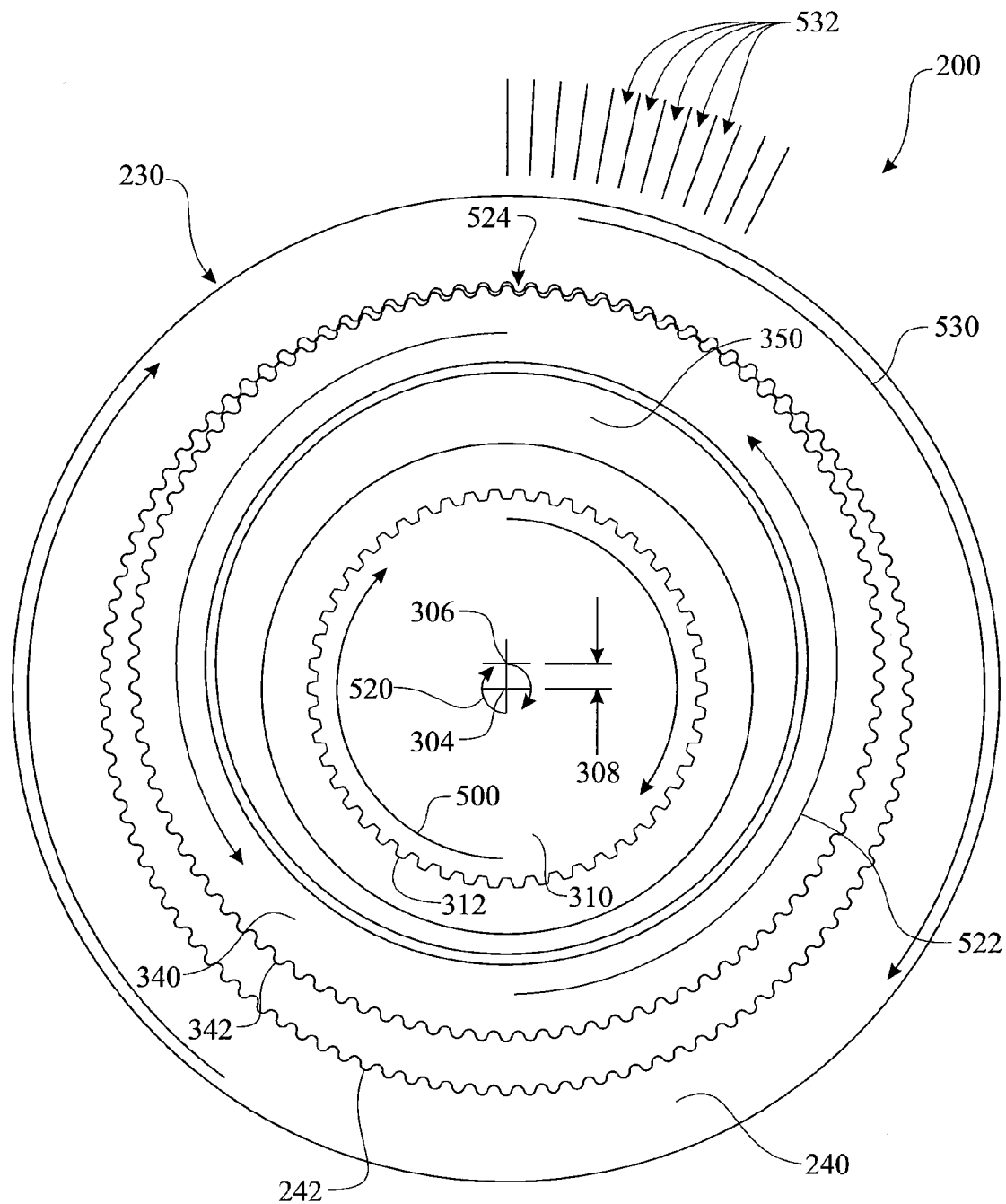
FIG. 21 is an exemplary plan view illustrating operation of a second operative portion of the coaxial reduction gear assembly in engagement with an output drive gear.
Figure 22:
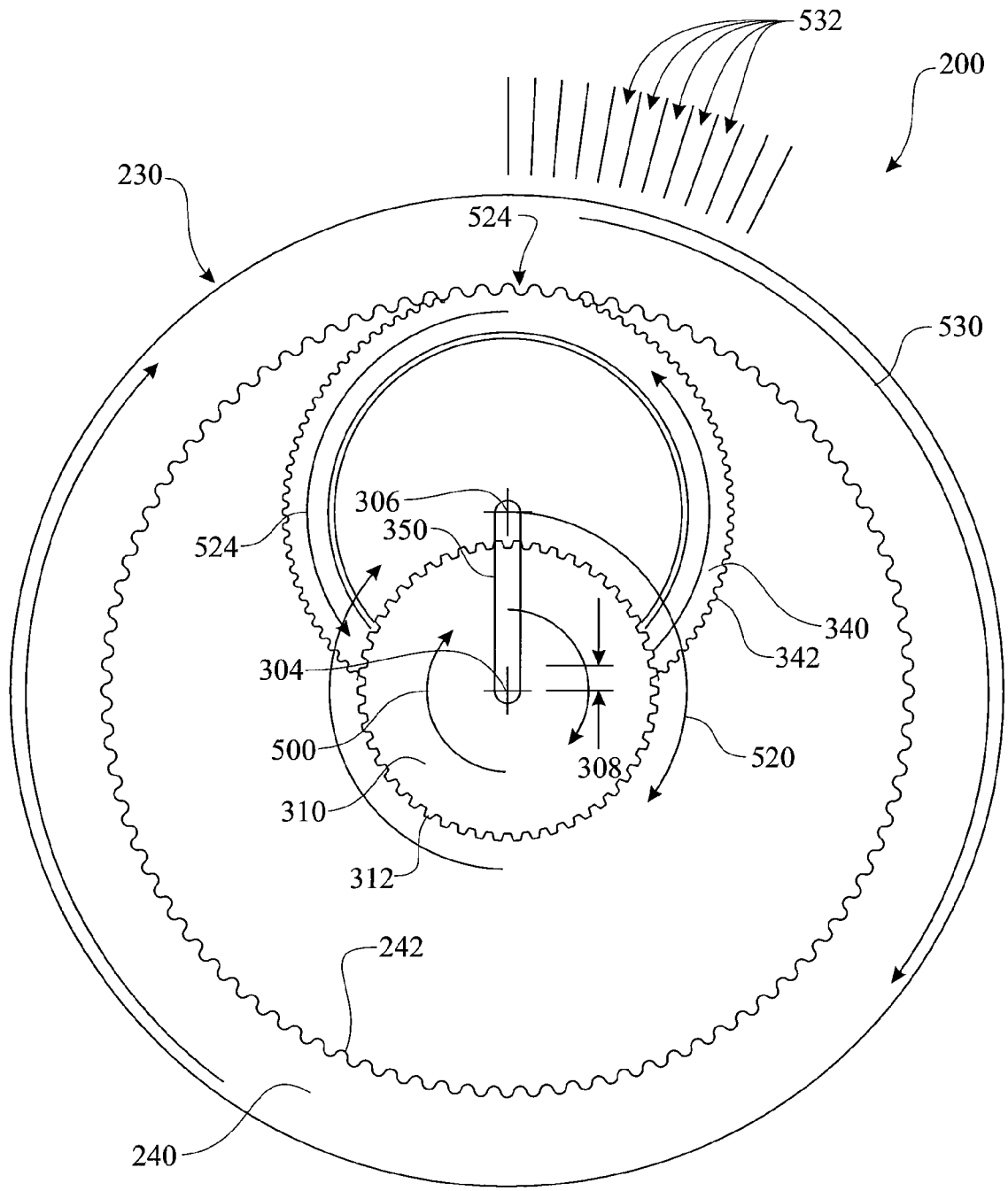
FIG. 22 is an exemplary exaggerated schematic demonstrating the components of operation of the second operative portion of the coaxial reduction gear assembly in engagement with the output drive gear.

Operation of the coaxial reduction gear assembly 200 is presented in FIGS. 19 through 22. The operation is presented in two segments: an input portion engaging with the stationary gear enclosure section 210, wherein the stationary gear enclosure section 210 is secured to remain stationary and an output portion engaging with the output rotational gear enclosure section 230, wherein the output rotational gear enclosure section 230 applies a rotational motion to an attached object. The input portion is illustrated in FIG. 19 and exaggerated to better illustrate the concept in FIG. 20. The output portion is illustrated in FIG. 21 and exaggerated to better illustrate the concept in FIG. 22.

A torsional input force is provided by a rotational drive mechanism, such as the axially registered direct drive motor assembly 130 or offset motor assembly 140. The rotational motion is applied to the input gear 310, preferably through either direct or indirect engagement of the rotational drive mechanism with the series of input gear teeth 312 of the input gear 310. The rotational motion drives a rotation of the input shaft and planetary carrier combination 300 in accordance with an input shaft and planetary carrier rotational motion 500. The planetary gear cam section 320 of the input shaft and planetary carrier combination 300 provides a planetary gear rotational offset 308 to a centroid of the planet wheel gear first stage 330. The planet wheel gear first stage 330 is rotated about a planet wheel gear first stage rotational path 510. Since a first planetary gear cam bearing 326 is assembled between the first planetary gear cam section 320 and the planet wheel gear first stage 330, the motion along the planet wheel gear first stage rotational path 510 is independent of a rotational motion of the planet wheel gear first stage 330. The planet wheel gear first stage teeth 332 engage with stationary gear teeth 222 of the stationary gear body 220 as identified as a planetary gear first stage engagement 514. The planetary gear first stage engagement 514 causes the planet wheel gear first stage 330 to rotate about the planetary gear rotational axis 306. The ratios of the gearing and offset provided by the cam reduces the rotation of the planet wheel gear first stage 330 to a ratio of A:B, where A represents the input shaft and planetary carrier rotational motion 500 and B represents the planet wheel gear first stage rotational motion 512. In one exemplary embodiment, the input shaft and planetary carrier rotational motion 500 is rotated in approximately 10 full revolutions for each full revolution (512) of the planet wheel gear first stage 330. This arrangement provides a first stage of a gear reduction.

The planet wheel gear first stage 330 and planet wheel gear second stage 340 are assembled into a single rigid unit, referred to as the planetary gear 206, and are preferably formed as a unitarily fabricated component, as illustrated in FIGS. 7 through 9, and therefore, rotate in unison. The planet wheel gear first stage 330 and planet wheel gear second stage 340 have two distinctive differences: the number of teeth 332, 342 and the diameter 339,349 respectively. Similarly, the stationary gear body 220 and output gear body 240 have a different number of teeth 222, 242 and different diameters (not identified by well understood by geometric definitions). The utilization of the differentiating characteristics results in a slight mismatch of linear distance between the planetary gear first stage engagement 514 and the planetary gear second stage engagement 524. The stationary gear body 220 is secured to a fixed element of the rotational positioning system 100. By securing the stationary gear body 220, the rotational drive motion applied to the input gear 310 moves the planet wheel gear first stage 330 in a circular motion (510). Since the stationary gear enclosure section 210 is retained in a fixed position, the planetary gear first stage engagement 514 causes the planet wheel gear first stage 330 to rotate about the planetary gear rotational axis 306. The planet wheel gear second stage 340 moves along a planet wheel gear second stage rotational path 520. The interrelation between the planet wheel gear first stage 330 and planet wheel gear second stage 340 directs the planet wheel gear second stage 340 to rotate. The rotating planet wheel gear second stage 340 engages with the output gear teeth 242 of the output gear body 240 integrated into the output rotational gear enclosure section 230 at a planetary gear second stage engagement 524. The planetary gear second stage engagement 524 transfers the torque applied by the planet wheel gear second stage rotational motion 522 to the output gear body 240, which applies a rotational force to the output rotational gear enclosure section 230 causing an output member rotational motion 530. An object is affixed to the output rotational gear enclosure section 230, wherein the rotational motion of the output rotational gear enclosure section 230 drives a motion of the object.

The differential in the number of teeth causes a very small incremental motion of the output rotational gear enclosure section 230 respective to the input shaft and planetary carrier rotational motion 500. This is illustrated in the incremental references illustrating an incremental rotational motion per input revolution 532. For each full revolution of the planet wheel gear first stage rotational path 510, the output rotational gear enclosure section 230 moves incrementally as illustrated by the rotational incrementing reference lines 532. In an alternative presentation, the interface between the stationary gear body 220 and planet wheel gear first stage 330 creates a first linear distance of travel and the interface between the output gear body 240 and planet wheel gear second stage 340 creates a second linear distance of travel. The first linear distance of travel is slightly greater than the second linear distance of travel. The resulting delta generates the incremental rotational motion per input revolution 532.

Although the coaxial reduction gear assembly 200 utilizes a series of gears, it is understood that the coaxial reduction gear assembly 200 can utilize a series of frictionally engaging wheels. The planetary wheel 206 would be include a planet wheel gear first stage 330 comprising an outer first stage frictional wheel surface and a planet wheel gear second stage 340 comprising an outer second stage frictional wheel surface. The outer first stage frictional wheel surface would frictionally engage with an inner diameter frictional wheel surface of a stationary body wheel 220. The outer second stage frictional wheel surface would frictionally engage with an inner diameter frictional wheel surface of an outer body wheel 240. A planet wheel gear first stage diameter 339 would be greater than a planet wheel gear second stage diameter 349. A stationary wheel contacting surface diameter would be smaller than an outer wheel contacting surface diameter. The difference in diameters of the engaging wheels in conjunction with the planetary motion of the planetary wheel causes the outer wheel to rotate.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A method of reducing an axial rotational motion using a coaxial reduction gear assembly, the coaxial reduction gear assembly comprising:
    an internally configured stationary gear section comprising a stationary gear having a quantity of stationary gear teeth disposed in a spatial arrangement about an interior circumferential surface defined by a stationary gear diameter, said internally configured stationary gear section being concentric about a central shaft rotational axis,
    a first stage externally configured planetary gear having a quantity of first stage gear teeth disposed in a spatial arrangement about an exterior circumferential surface defined by a first stage gear diameter, said first stage externally configured planetary gear being concentric about a planetary gear rotational axis,
    a second stage externally configured planetary gear having a quantity of second stage gear teeth disposed in a spatial arrangement about an exterior circumferential surface defined by a second stage gear diameter, said second stage externally configured planetary gear being concentric about said planetary gear rotational axis,
    an internally configured output gear having a quantity of output gear teeth disposed in a spatial arrangement about an interior circumferential surface defined by a output gear diameter, said internally configured stationary gear section being concentric about said central shaft rotational axis,
the method comprising steps of:
    mounting said internally configured stationary gear section to an object to maintain said stationary gear section in a fixed position, said:
    engaging said first stage externally configured planetary gear with said internally configured stationary gear;
    rotating said planetary gear rotational axis of said first stage planetary gear along a circular path centered about said central shaft rotational axis at an input rotational rate, wherein said planetary gear rotational axis is distally located from said central shaft rotational axis by a planetary gear rotational offset, wherein engagement between said first stage planetary gear and said stationary gear causes said first stage planetary gear to rotate about said planetary gear rotational axis while moving said planetary gear rotational axis along said circular path;
    said first stage planetary gear rotates said second stage planetary gear about said planetary gear rotational axis in unison and moves said second stage planetary gear along said circular path; and
    engaging said second stage planetary gear with said internally configured output gear,
    wherein said quantity of stationary gear teeth is greater than said quantity of output gear teeth,
    wherein said quantity of first stage gear teeth is greater than said quantity of second stage gear teeth,
    wherein, in operation, input shaft is rotated, driving a rotation of said first stage gear teeth about said stationary gear teeth along said circular path centered about said central shaft rotational axis at said input rotational rate, said first stage gear teeth rotate said second stage gear teeth at a same rotational rate and moving along said circular path, said second stage gear teeth engaging with said output gear teeth, driving a rotation of said output gear about said central shaft rotational axis,
    resulting in said output gear rotating about said central shaft rotational axis at a reduced rotational rate compared to said input rotational rate.

2. The method of reducing an axial rotational motion as recited in claim 1, the method comprising the additional step of:
    rotating an input shaft at said input rotational rate, said input shaft being concentric about said central shaft rotational axis, wherein said input shaft rotates said planetary gear rotational axis along said circular path centered about said central shaft rotational axis at said input rotational rate.

3. The method of reducing an axial rotational motion as recited in claim 2, the method comprising the additional step of:
    coupling said input shaft and said planetary gear to one another by a planetary gear cam, said planetary gear cam comprising a peripheral surface that is concentric about said planetary gear rotational axis, wherein said planetary gear peripheral surface is in rotational engagement with said planetary gear, wherein said planetary gear cam is affixed to said input shaft at a location offset from said planetary gear rotational axis.

4. The method of reducing an axial rotational motion as recited in claim 3, the method comprising the additional steps of:
    controlling a rotational position of said output gear by:
        determining a current rotational position of said output gear,
        determining a desired rotational position of said output gear, rotating said input shaft about said central shaft rotational axis at an input rotational rate until said output gear is positioned at said desired rotational position.

5. The method of reducing an axial rotational motion as recited in claim 1, the method comprising the additional step of:
rotationally supporting said stationary gear and said output gear by integrating an enclosure bearing therebetween, wherein said enclosure bearing is centered about said central shaft rotational axis.

6. The method of reducing an axial rotational motion as recited in claim 1, the method comprising the additional step of:
further reducing said output rotational rate respective to said input rotational rate by integrating said output gear having an output gear contacting surface diameter that is smaller than said stationary gear contacting surface diameter.

7. The method of reducing an axial rotational motion as recited in claim 1, the method comprising the additional steps of:
controlling a rotational position of said output gear by:
determining a current rotational position of said output gear,
determining a desired rotational position of said output gear,
rotating said planetary gear rotational axis of said first stage planetary gear along a circular path centered about said central shaft rotational axis at an input rotational rate until said output gear is positioned at said desired rotational position.

8. A method of reducing an axial rotational motion, the method comprising steps of:
mounting an internally configured stationary gear to an object to maintain said stationary gear in a fixed position;
engaging a first stage externally configured planetary gear with a said internally configured stationary gear, said stationary gear being concentric about a central shaft rotational axis and said planetary gear being concentric about a planetary gear rotational axis;
rotating said planetary gear rotational axis of said first stage planetary gear along a circular path centered about said central shaft rotational axis at an input rotational rate, wherein said planetary gear rotational axis is parallel to and distally located from said central shaft rotational axis by a planetary gear rotational offset, wherein engagement between said first stage planetary gear and said stationary gear causes said first stage planetary gear to rotate about said planetary gear rotational axis while moving along said circular path;
said first stage planetary gear rotates a second stage planetary gear about a common planetary gear rotational axis, said first stage planetary gear comprising a quantity of first stage teeth and said second stage planetary gear comprising a quantity of second stage teeth, wherein said quantity of first stage teeth is different than said quantity of second stage teeth;
rotationally supporting an internally configured output gear by said internally configured stationary gear, wherein said output gear and said stationary gear are coaxially arranged and concentric with said central shaft rotational axis; and
engaging said second stage planetary gear with said internally configured output gear, wherein a combination of said rotation of said second stage planetary gear in conjunction with said difference in quantities of said first stage teeth and said second stage teeth causes said output gear to rotate about said central shaft rotational axis at a reduced rotational rate compared to said input rotational rate.

9. The method of reducing an axial rotational motion as recited in claim 8, the method comprising the additional step of:
rotating an input shaft at said input rotational rate, said input shaft being concentric about said central shaft rotational axis, wherein said input shaft rotates said planetary gear rotational axis along said circular path centered about said central shaft rotational axis at said input rotational rate.

10. The method of reducing an axial rotational motion as recited in claim 9, the method comprising the additional step of:
coupling said input shaft and said planetary gear to one another by a planetary gear cam, said planetary gear cam comprising a peripheral surface that is concentric about said planetary gear rotational axis, wherein said planetary gear peripheral surface is in rotational engagement with said planetary gear, wherein said planetary gear cam is affixed to said input shaft at a location offset from said planetary gear rotational axis.

11. The method of reducing an axial rotational motion as recited in claim 10, the method comprising the additional steps of:
controlling a rotational position of said output gear by:
determining a current rotational position of said output gear,
determining a desired rotational position of said output gear,
rotating said input shaft about said central shaft rotational axis at an input rotational rate until said output gear is positioned at said desired rotational position.

12. The method of reducing an axial rotational motion as recited in claim 8, the method comprising the additional step of:
rotationally supporting said stationary gear and said output gear by integrating an enclosure bearing therebetween, wherein said enclosure bearing is centered about said central shaft rotational axis.

13. The method of reducing an axial rotational motion as recited in claim 8, the method comprising the additional step of:
further reducing said output rotational rate respective to said input rotational rate by integrating said stationary gear comprising a quantity of stationary gear teeth and said output gear comprising a quantity of output gear teeth, wherein said quantity of stationary gear teeth is greater than said quantity of output gear teeth.

14. The method of reducing an axial rotational motion as recited in claim 8, the method comprising the additional steps of:
controlling a rotational position of said output gear by:
determining a current rotational position of said output gear,
determining a desired rotational position of said output gear,
rotating said planetary gear rotational axis of said first stage planetary gear along a circular path centered about said central shaft rotational axis at an input rotational rate until said output gear is positioned at said desired rotational position.

15. A method of reducing an axial rotational motion, the method comprising steps of:

determining a desired direction of rotation of an output gear respective to a direction of rotation of an input gear of a coaxial reduction gear assembly mounting an internally configured stationary gear to an object to maintain said stationary gear in a fixed position;

engaging a first stage externally configured planetary gear with said internally configured stationary gear, said stationary gear being concentric about a central shaft rotational axis and said planetary gear being concentric about a planetary gear rotational axis;

rotating said planetary gear rotational axis of said first stage planetary gear along a circular path centered about said central shaft rotational axis at an input rotational rate, wherein said planetary gear rotational axis is parallel to and distally located from said central shaft rotational axis by a planetary gear rotational offset, wherein engagement between said first stage planetary gear and said stationary gear causes said first stage planetary gear to rotate about said planetary gear rotational axis while moving along said circular path;

said first stage planetary gear rotates a second stage planetary gear about a common planetary gear rotational axis, said first stage planetary gear having first stage planetary gear diameter and a quantity of first stage teeth and said second stage planetary gear having second stage planetary gear diameter and a quantity of second stage teeth, selecting a direction of rotation of said output gear respective to said input gear by using one of the following configurations: in a first configuration, said first stage planetary gear diameter is greater than said second planetary gear diameter and said quantity of first stage teeth is greater than said quantity of second stage teeth resulting in a first rotational direction of said output gear, and in a second configuration, said first stage planetary gear diameter is smaller than said second planetary gear diameter and said quantity of first stage teeth is smaller than said quantity of second stage teeth resulting in a second rotational direction of said output gear, wherein said first rotational direction and said second rotational direction are opposite one another;

wherein said rotation of said output gear is in a first direction respective to said direction of rotation of said input gear in a condition where said quantity of said first stage teeth is greater than said quantity of said second stage teeth, and wherein said rotation of said output gear is in a second direction respective to said direction of rotation of said input gear in a condition where said quantity of said first stage teeth is greater than said quantity of said second stage teeth, wherein said second direction is opposite of said first direction; and engaging said second stage planetary gear with an internally configured output gear said output gear being concentric about said central shaft rotational axis, wherein a combination of said rotation of said second stage planetary gear in conjunction with said difference in quantities of said first stage teeth and said second stage teeth causes said output gear to rotate about said central shaft rotational axis at a reduced rotational rate compared to said input rotational rate.

16. The method of reducing an axial rotational motion as recited in claim 15, the method comprising the additional step of:

rotating an input shaft at said input rotational rate, said input shaft being concentric about said central shaft rotational axis, wherein said input shaft rotates said planetary gear rotational axis along said circular path centered about said central shaft rotational axis at said input rotational rate.

17. The method of reducing an axial rotational motion as recited in claim 16, the method comprising the additional step of:

coupling said input shaft and said planetary gear to one another by a planetary gear cam, said planetary gear cam comprising a peripheral surface that is concentric about said planetary gear rotational axis, wherein said planetary gear peripheral surface is in rotational engagement with said planetary gear, wherein said planetary gear cam is affixed to said input shaft at a location offset from said planetary gear rotational axis.

18. The method of reducing an axial rotational motion as recited in claim 15, the method comprising the additional step of:

rotationally supporting said stationary gear and said output gear by integrating an enclosure bearing therebetween, wherein said enclosure bearing is centered about said central shaft rotational axis.

19. The method of reducing an axial rotational motion as recited in claim 15, the method comprising the additional step of:

further reducing said output rotational rate respective to said input rotational rate by said integrating said stationary gear comprising a quantity of stationary gear teeth and said output gear comprising a quantity of output gear teeth, wherein said quantity of stationary gear teeth is greater than said quantity of output gear teeth.

20. The method of reducing an axial rotational motion as recited in claim 15, the method comprising the additional steps of:

controlling a rotational position of said output gear by:

determining a current rotational position of said output gear, determining a desired rotational position of said output gear, rotating said planetary gear rotational axis of said first stage planetary gear along a circular path centered about said central shaft rotational axis at an input rotational rate until said output gear is positioned at said desired rotational position.

* * * * *